Fig. — 2

April 5, 1938.  F. A. HOWARD  2,112,844
ROTARY ENGINE
Filed Jan. 3, 1933  20 Sheets-Sheet 4

FRANK A. HOWARD Inventor
Attorney

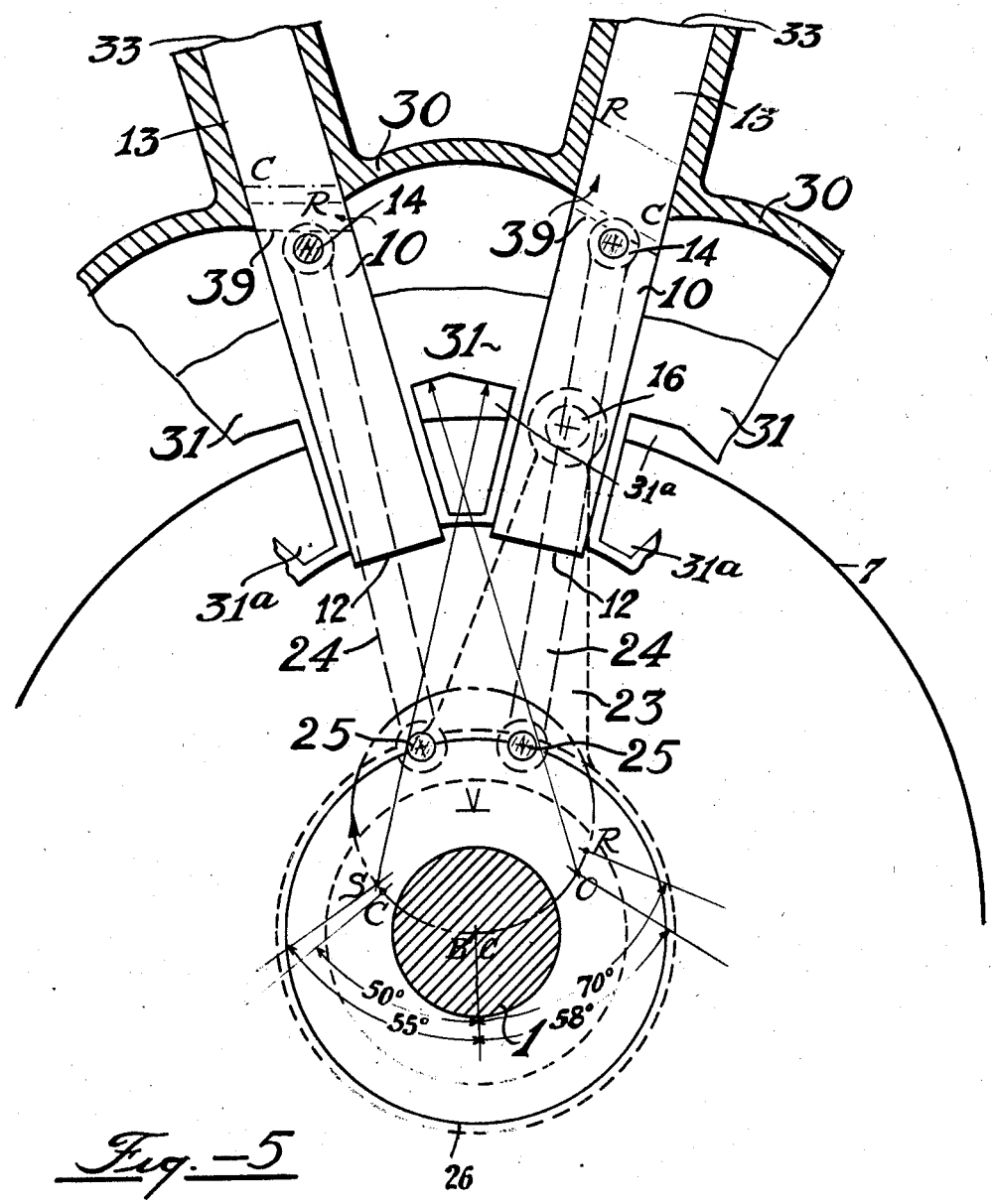

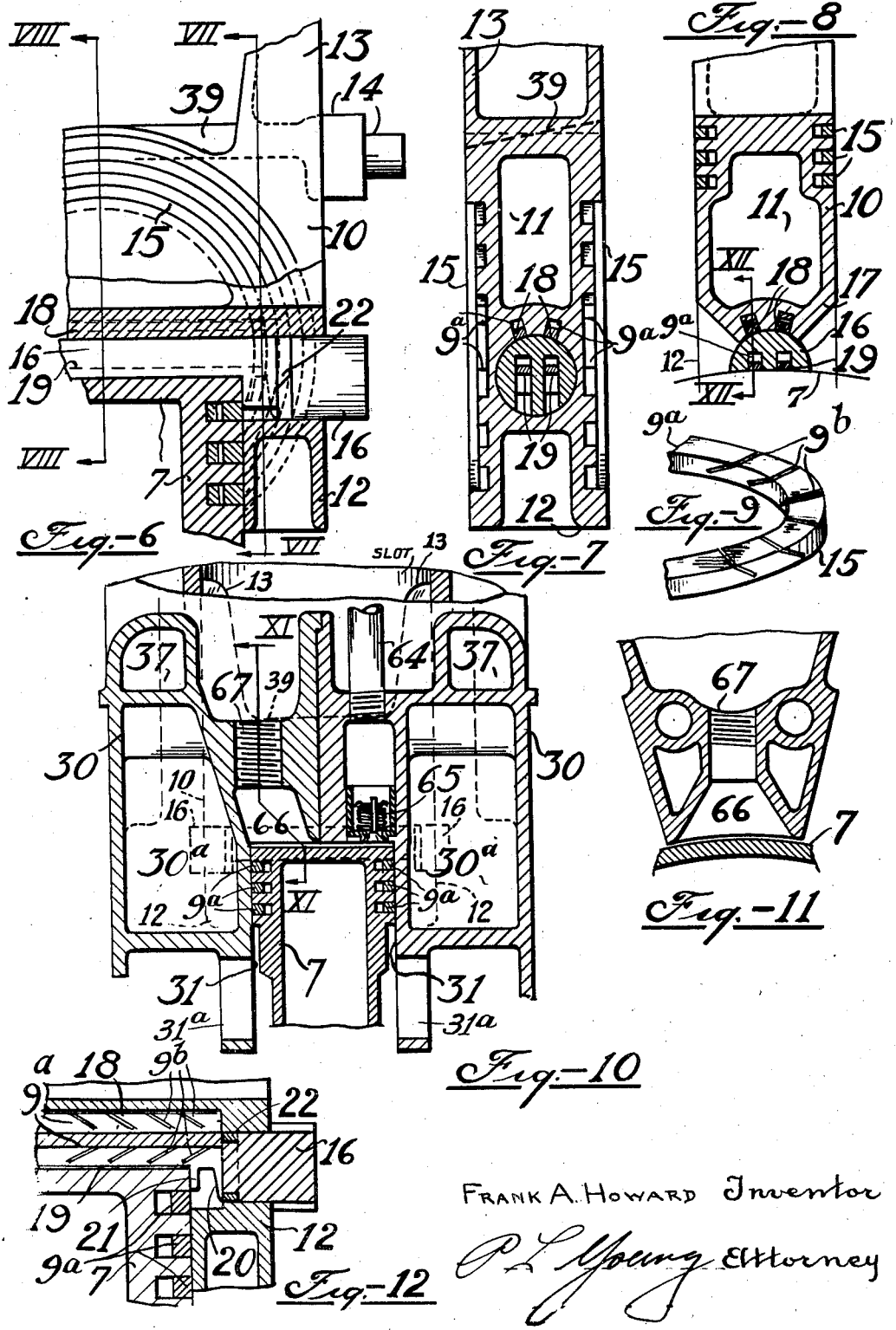

April 5, 1938.  F. A. HOWARD  2,112,844
ROTARY ENGINE
Filed Jan. 3, 1933  20 Sheets-Sheet 7
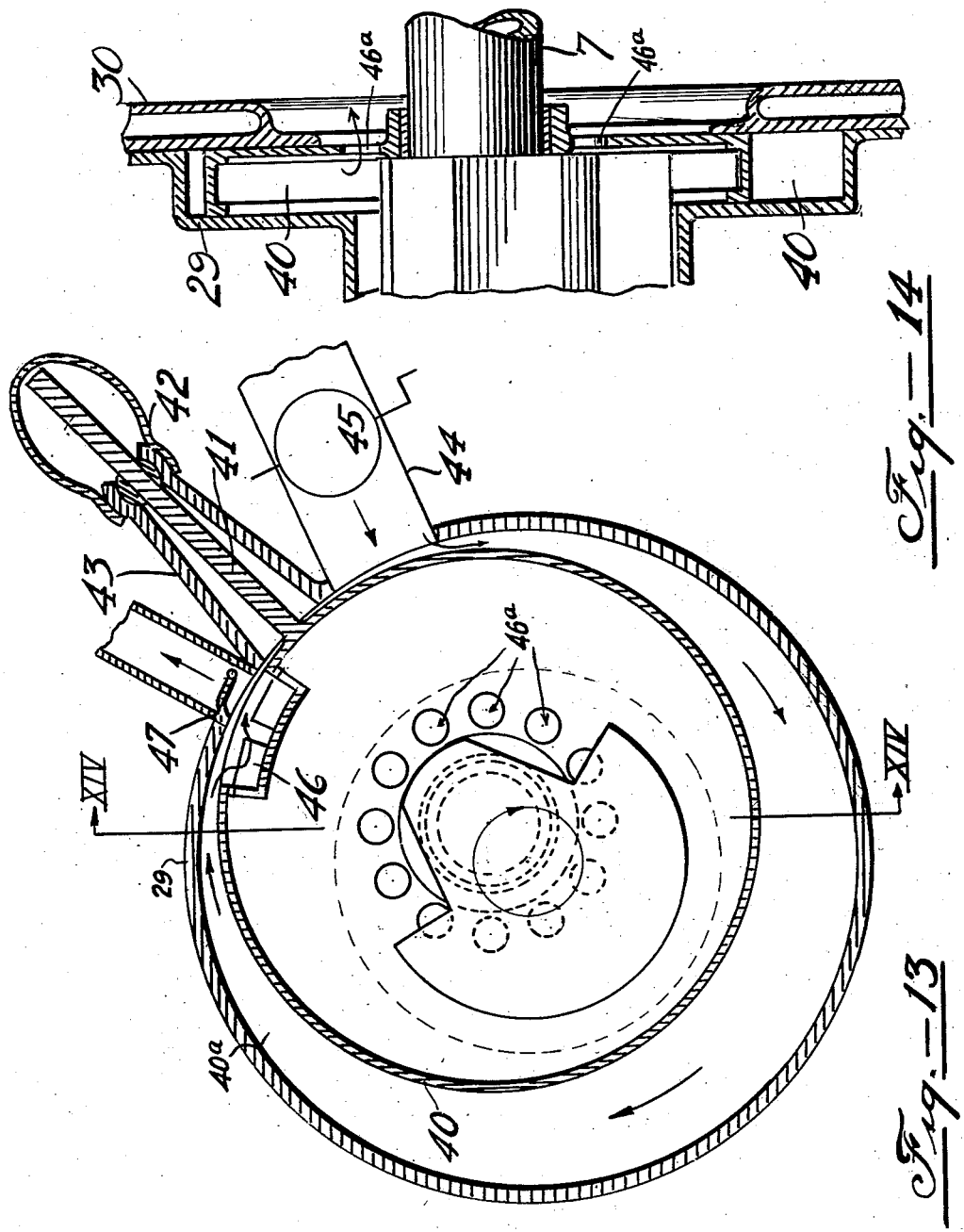

April 5, 1938.    F. A. HOWARD    2,112,844
ROTARY ENGINE
Filed Jan. 3, 1933    20 Sheets-Sheet 8
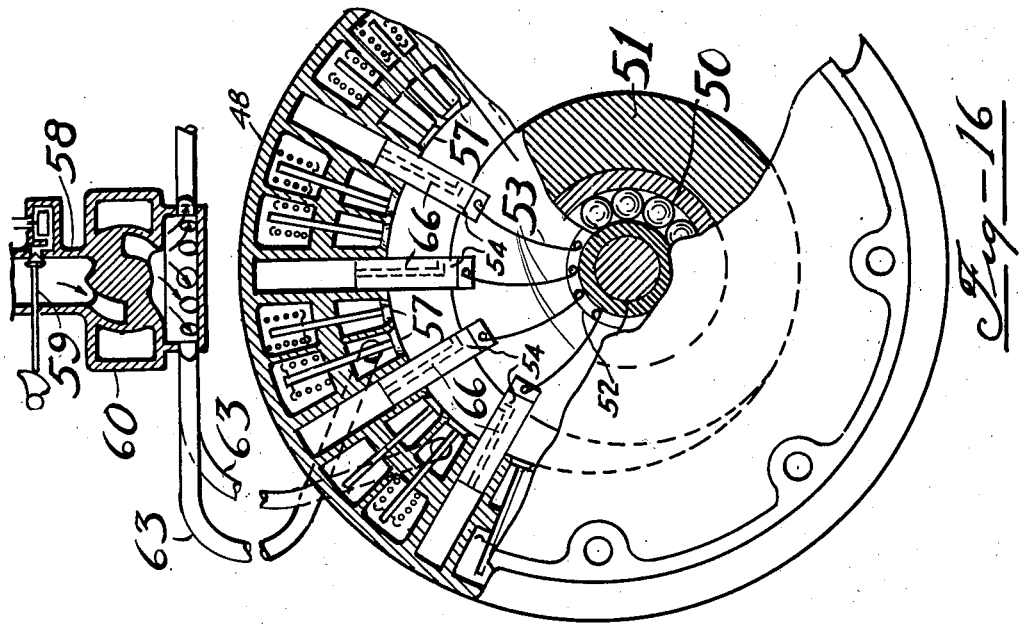
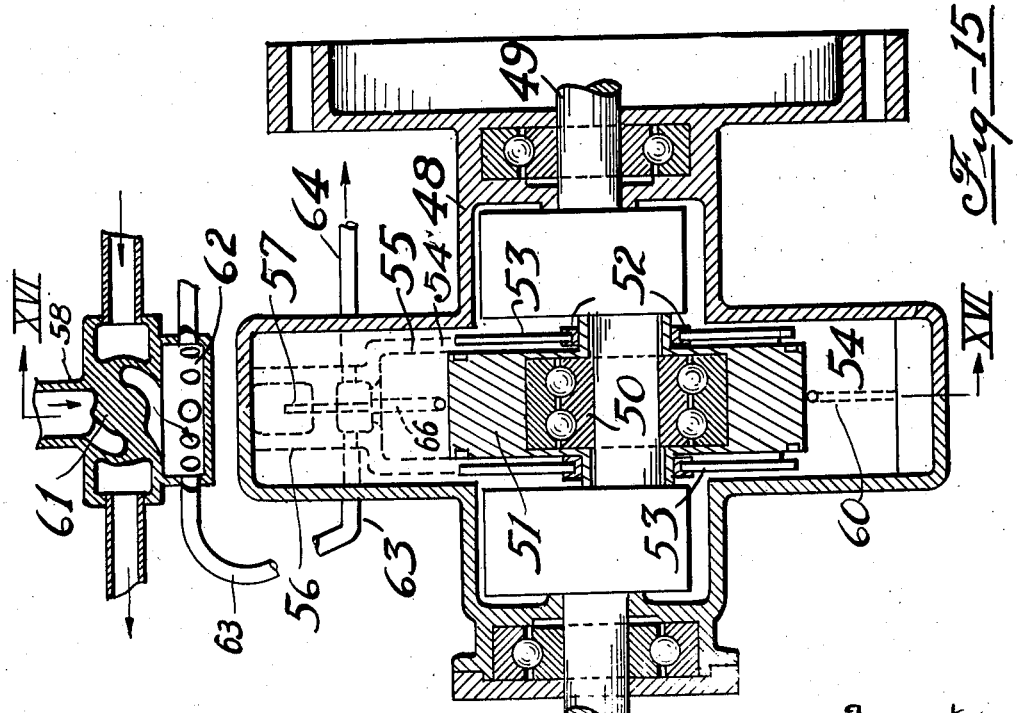
Inventor
FRANK A HOWARD
Attorney

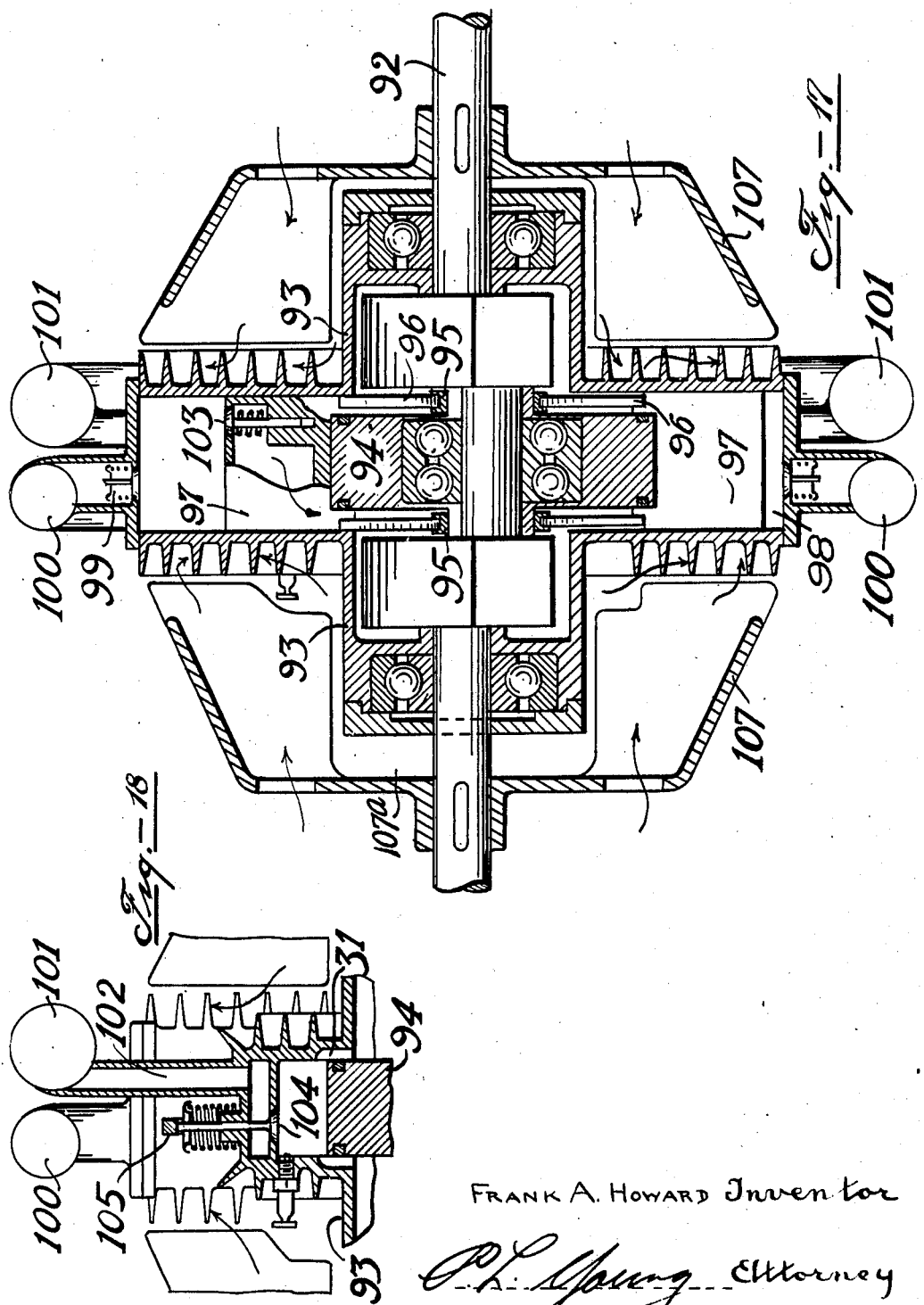

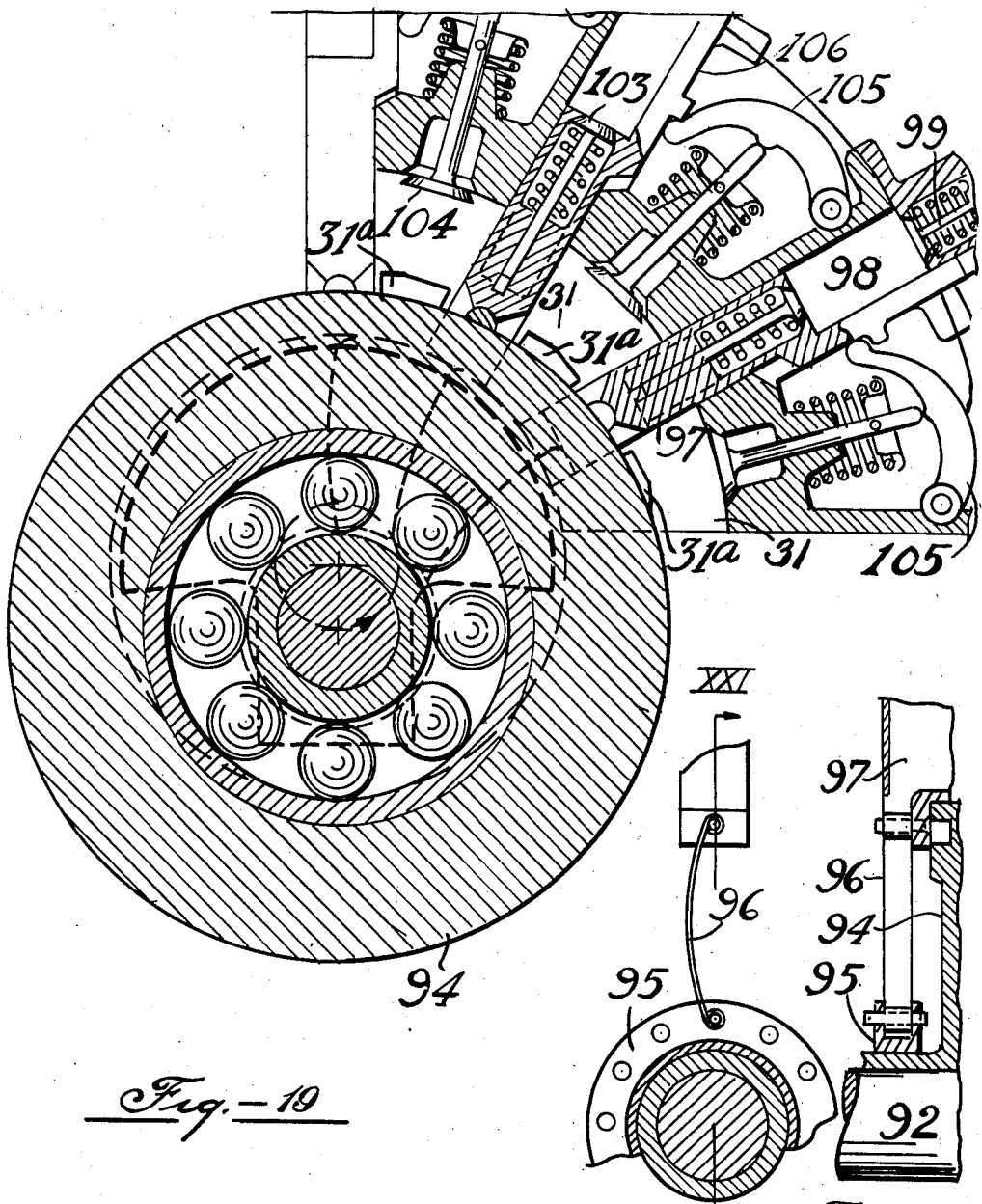

April 5, 1938.  F. A. HOWARD  2,112,844
ROTARY ENGINE
Filed Jan. 3, 1933  20 Sheets-Sheet 11
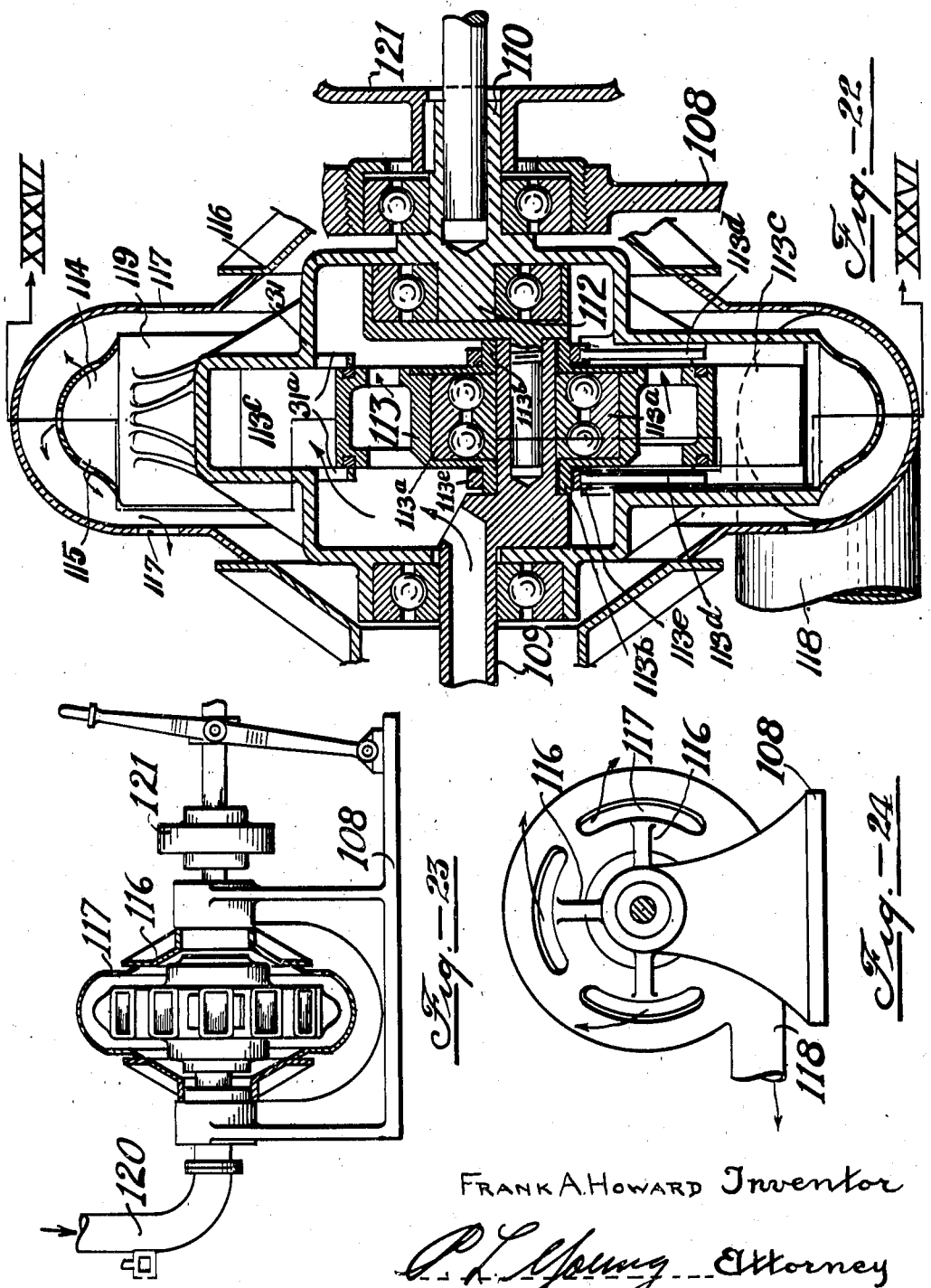

April 5, 1938.  F. A. HOWARD  2,112,844
ROTARY ENGINE
Filed Jan. 3, 1933   20 Sheets-Sheet 12

Frank A. Howard Inventor

April 5, 1938.  F. A. HOWARD  2,112,844
ROTARY ENGINE
Filed Jan. 3, 1933  20 Sheets-Sheet 16

FRANK A. HOWARD Inventor
P. L. Young Attorney

April 5, 1938. F. A. HOWARD 2,112,844
ROTARY ENGINE
Filed Jan. 3, 1933 20 Sheets-Sheet 17

Frank A. Howard Inventor
W. E. Currie, Attorney

April 5, 1938. F. A. HOWARD 2,112,844
ROTARY ENGINE
Filed Jan. 3, 1933 20 Sheets-Sheet 18

Frank A. Howard Inventor
W. E. Currie Attorney

April 5, 1938.  F. A. HOWARD  2,112,844
ROTARY ENGINE
Filed Jan. 3, 1933  20 Sheets-Sheet 19

Frank A. Howard Inventor
By W. E. Currie Attorney

April 5, 1938.  F. A. HOWARD  2,112,844
ROTARY ENGINE
Filed Jan. 3, 1933   20 Sheets-Sheet 20

Frank A. Howard Inventor
By W. E. Currie Attorney

Patented Apr. 5, 1938

2,112,844

UNITED STATES PATENT OFFICE 2,112,844

ROTARY ENGINE

Frank A. Howard, Elizabeth, N. J.

Application January 3, 1933, Serial No. 650,018

36 Claims. (Cl. 123—14)

My invention relates to fluid displacement engines or machines in which positive displacement of a working fluid against a pressure is effected by power applied to the driving of the engine, or in which a fluid under externally or internally created pressure is released or expanded through the engine, to drive the latter by positive displacement and produce power thereby. It is in general adaptable to all machines of this kind, such as compressors, blowers, steam and internal combustion engines, pumps and fluid clutches, couplings or brakes. I have called the machine of this invention a rotary engine. While the motion of the displacing member is one of rotation, as indicated by this name, there is a supplementary reciprocating motion essential to the operation.

In all such positive fluid displacement machines the fundamental kinematic problem is that of expanding and contracting the working chambers and mechanically coupling the moving walls of these chambers to those portions of the machine which are intended to transmit power to or from them. In the rotary engine the power is transmitted directly to or from a crankshaft by a moving chamber wall in the form of a rotating ring called the rotor journalled on the crank-pin, this moving wall being supplemented by partition walls called vanes which also move but only by reciprocating in their own planes and therefore against frictional resistance alone. In the kinematic design of general utility the positive motion of the rotor is that of an eccentric strap with infinitely long connection rod, but in addition to this positive motion it is free to slip or drift by rotation on its own axis under unbalanced frictional forces, such drift being immaterial to its displacement motion but of great practical importance. The motion of the vanes is one of rectilinear reciprocation in planes parallel with their surfaces exposed to the working fluid. In a modified design of more limited utility the rotor motion is that of an eccentric strap with connecting rod or arm of variable finite length, and the arm itself serves as the partition wall or vane.

The primary mechanical problems are those of sealing against leakage of the working fluid, lubricating the rubbing surfaces, and cooling those portions of the machine in which heat is generated or absorbed. A secondary problem common to all such machines is that of limiting and balancing inertia forces to permit operation at high speeds. In the rotary machine of the present invention these problems are satisfactorily solved by a design which lends itself to the necessary structural embodiments for a wide variety of uses without exceeding the limits set by industrial standards or workmanship and by the properties of available structural materials and lubricants. In order to show the range of practical application of the invention I have illustrated it primarily in the form of a complete rotary power unit comprising a two cycle rotary internal combustion engine equipped with rotary blowers for scavenging and air supply, a rotary compressor for inspiring and delivering under pressure to the working chambers of the engine a small proportion of the air carbureted with the total fuel supply, and a rotary oil clutch or coupling through which the power is transmitted from the engine to the load or from the load to the engine for braking action. I have also shown novel structural details, combinations and variants of the rotary machines themselves and of various component elements useful in one or more forms of the machine and all constituting pertinent disclosure of the nature and uses of the invention and of the best manner of applying it.

In the accompanying drawings,

Fig. 5 is an enlarged transverse sectional diagrammatic detail showing the principles followed in designing the air and exhaust ports to obtain a desired timing cycle.

Fig. 6 is an enlarged fragmentary section through a vane taken along the line VI—VI of Fig. 3.

Fig. 7 is a section of the line VII—VII on Fig. 6.

Fig. 8 is a section of the line VIII—VIII on Fig. 6.

Fig. 9 is a fragmentary perspective of one of the packing rings used in the rotor and vane.

Fig. 10 is a detailed section through the head of a working chamber of the engine showing the form of the combustion space used for high turbulence and also showing diagrammatically the valve used for introducing the fuel charge.

Fig. 11 is a section on the line XI—XI of Fig. 10.

Fig. 12 is a fragmentary section similar to Fig. 6 but taken on a section line (XII—XII of Fig. 8) showing the sealing strips.

Fig. 13 is a transverse section through the blower indicating diagrammatically the means for admitting and delivering the air.

Fig. 14 is a section on the line XIV—XIV of Fig. 13.

Fig. 15 is an enlarged axial section of the charge compressor, shown as an independent unit.

Fig. 16 is a section, partly in elevation, on the line XVI—XVI of Fig. 15.

Fig. 17 is an axial section of a modified form of two-cycle rotary engine in which the vanes are used as reciprocating blower pistons for inspiring and introducing the charge.

Fig. 18 is a fragmentary detailed section of a combustion chamber of the engine of Fig. 17 showing the exhaust valve.

Fig. 19 is an enlarged fragmentary section of the engine shown in Figs. 17 and 18 showing the exhaust valve operating means and other details.

Fig. 20 is a fragmentary section through the crankpin showing the vane in side elevation and the elastic link which operates it.

Fig. 21 is a section on the line XXI—XXI of Fig. 20.

Fig. 22 is an axial section of a rotary engine having a stationary crankshaft and revolving casing.

Fig. 23 is a side elevation of a complete power unit of the stationary crankshaft type, the air cowling being shown in section.

Fig. 24 is an end view of the unit of Fig. 23 showing the method of leading off the exhaust gases.

Figure 4:
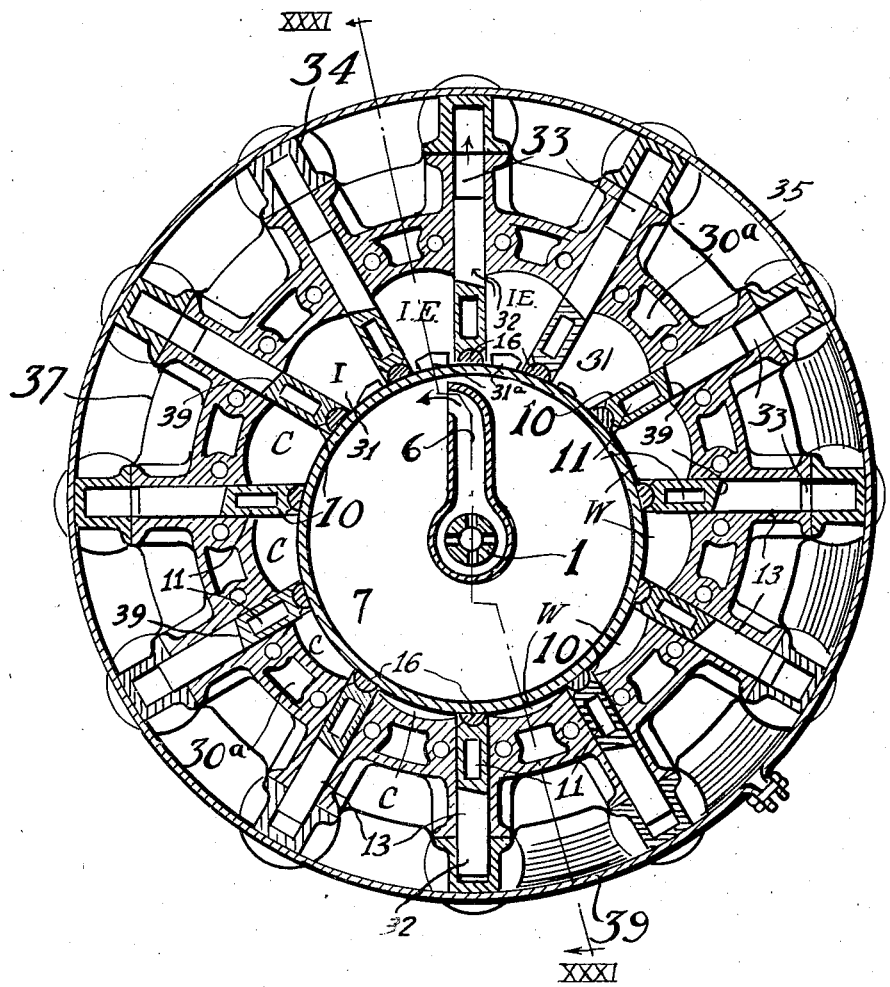
Fig. 4 is a transverse section on the line IV—IV of Fig. 2.
Figure 31:
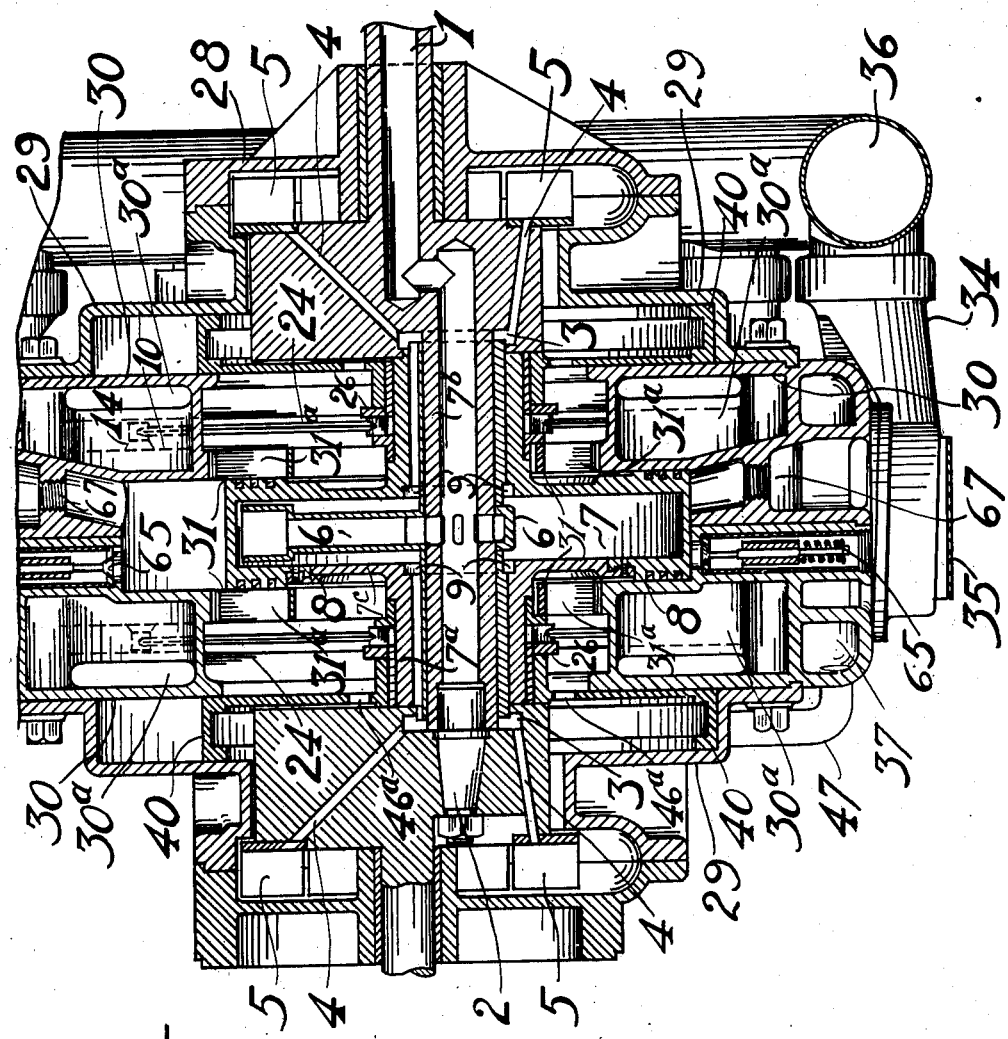
Figure 32:
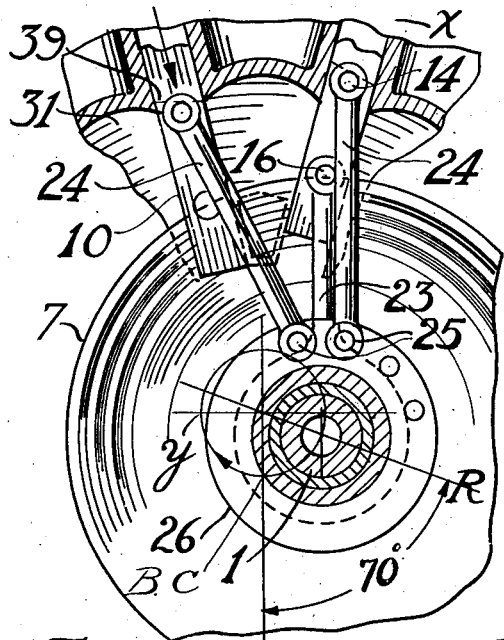
Figure 33:
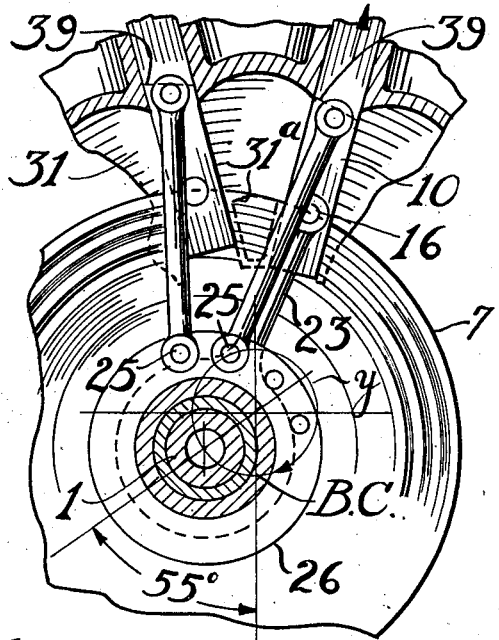
Figure 34:
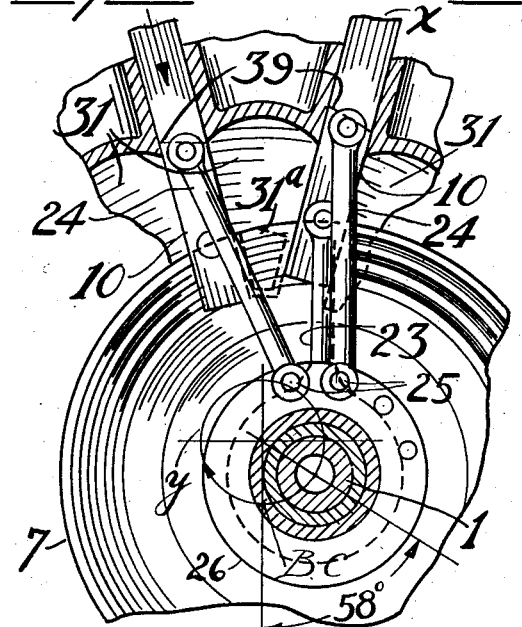
Figure 35:
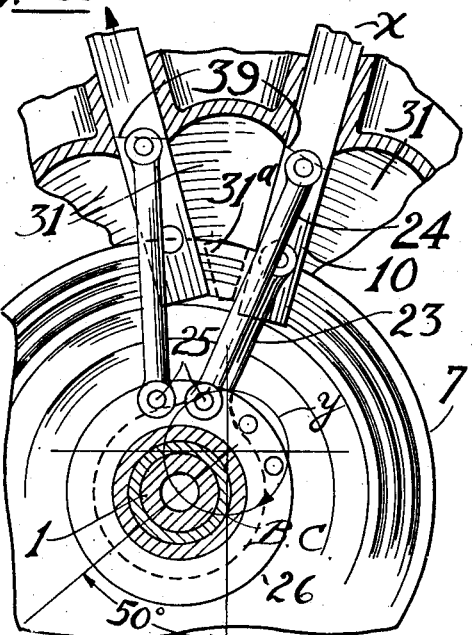
Figure 36:
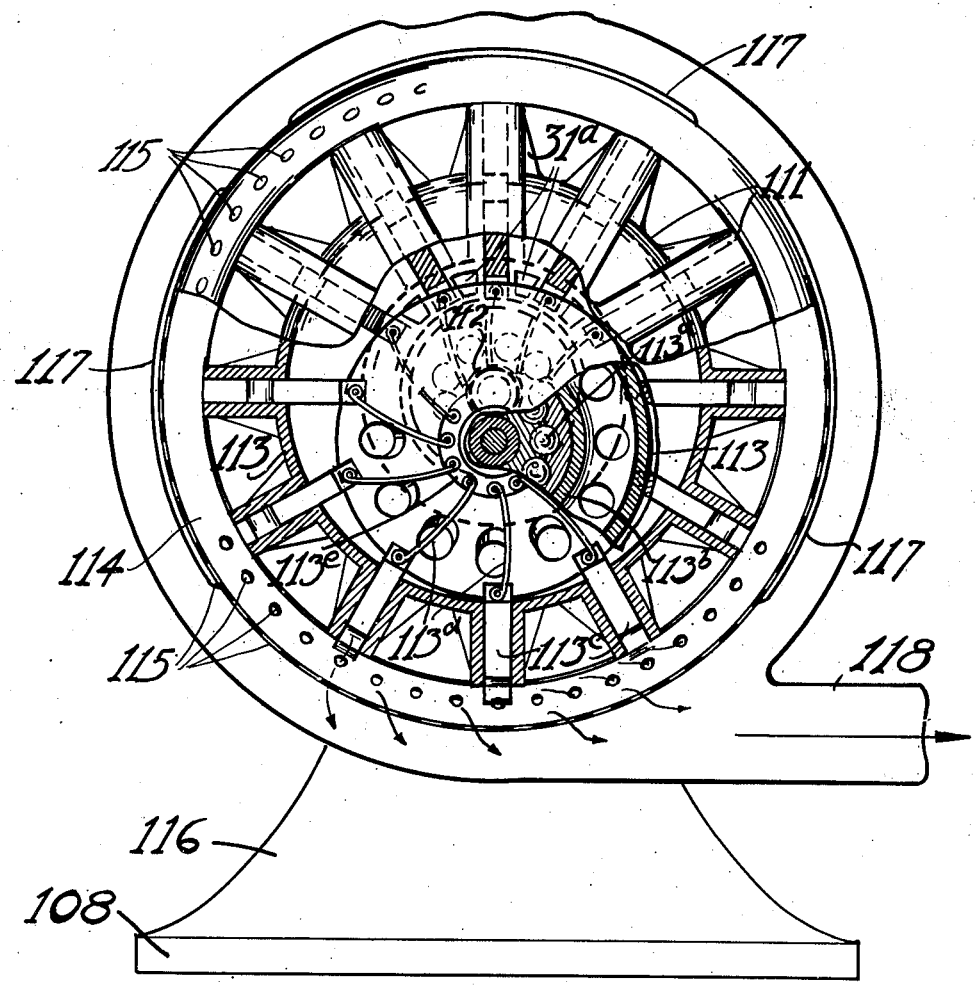

Fig. 31 is a detailed longitudinal axial section through the engine taken along the line XXXI—XXXI of Fig. 4. Fig. 32 is a fragmentary vertical sectional view through the engine casing showing in side elevation the linkage arrangement for controlling reciprocation of the vanes with the crankpin at a point 70° before bottom dead center. Fig. 33 is a view similar to Fig. 32 showing the crankpin moved to a position 58° before bottom dead center. Fig. 34 is a view similar to Fig. 32 showing the crankpin moved to a position 50° past bottom dead center. Fig. 35 is a view similar to Fig. 40 showing the crankpin moved to a position 55° past bottom dead center. Fig. 36 is a transverse sectional view taken along the line XXXVI—XXXVI of Fig. 22.

Figure 37:
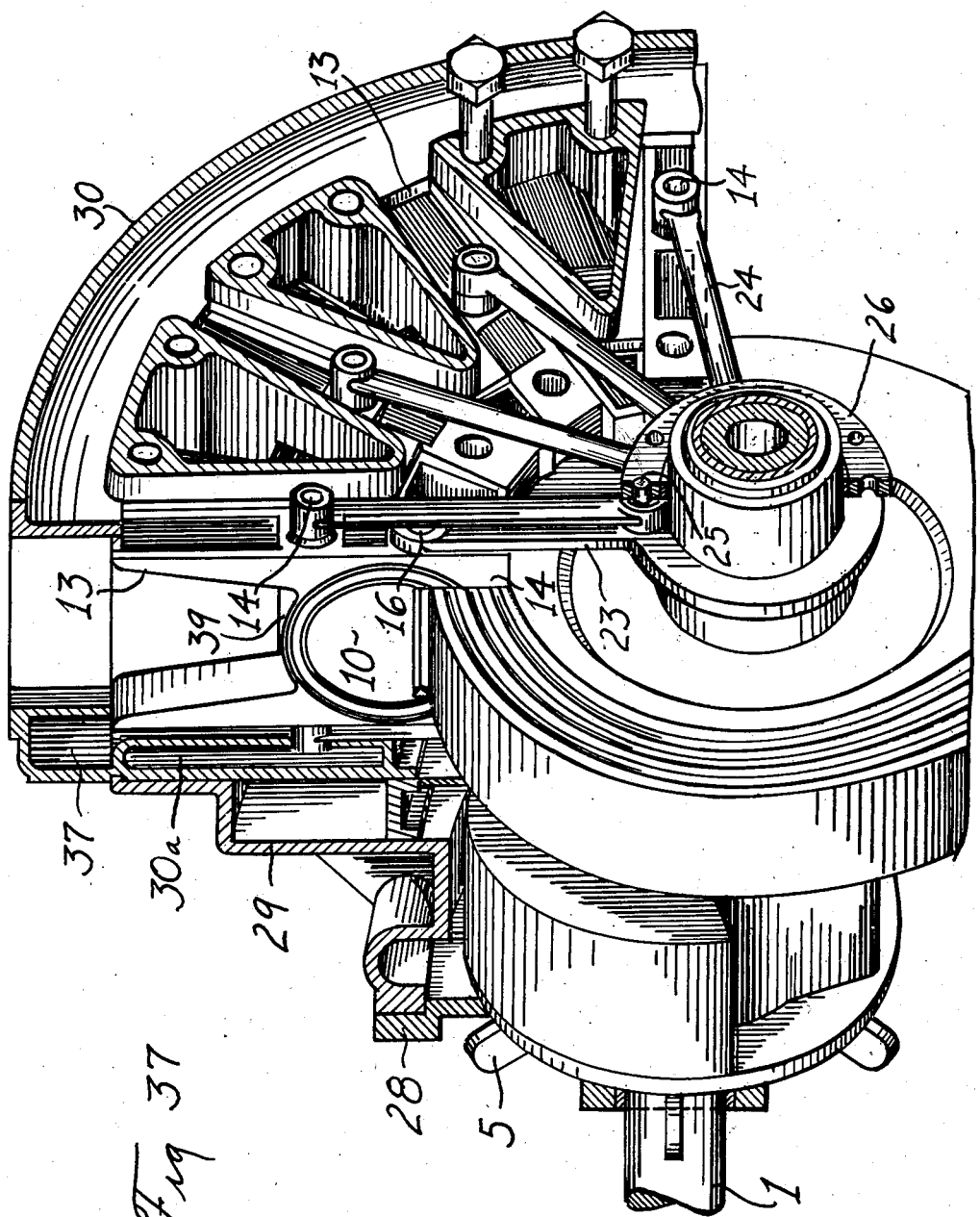

Fig. 37 is a perspective view of the general organization of the engine, showing the arrangement of the master rod and link rods.

Figure 1:
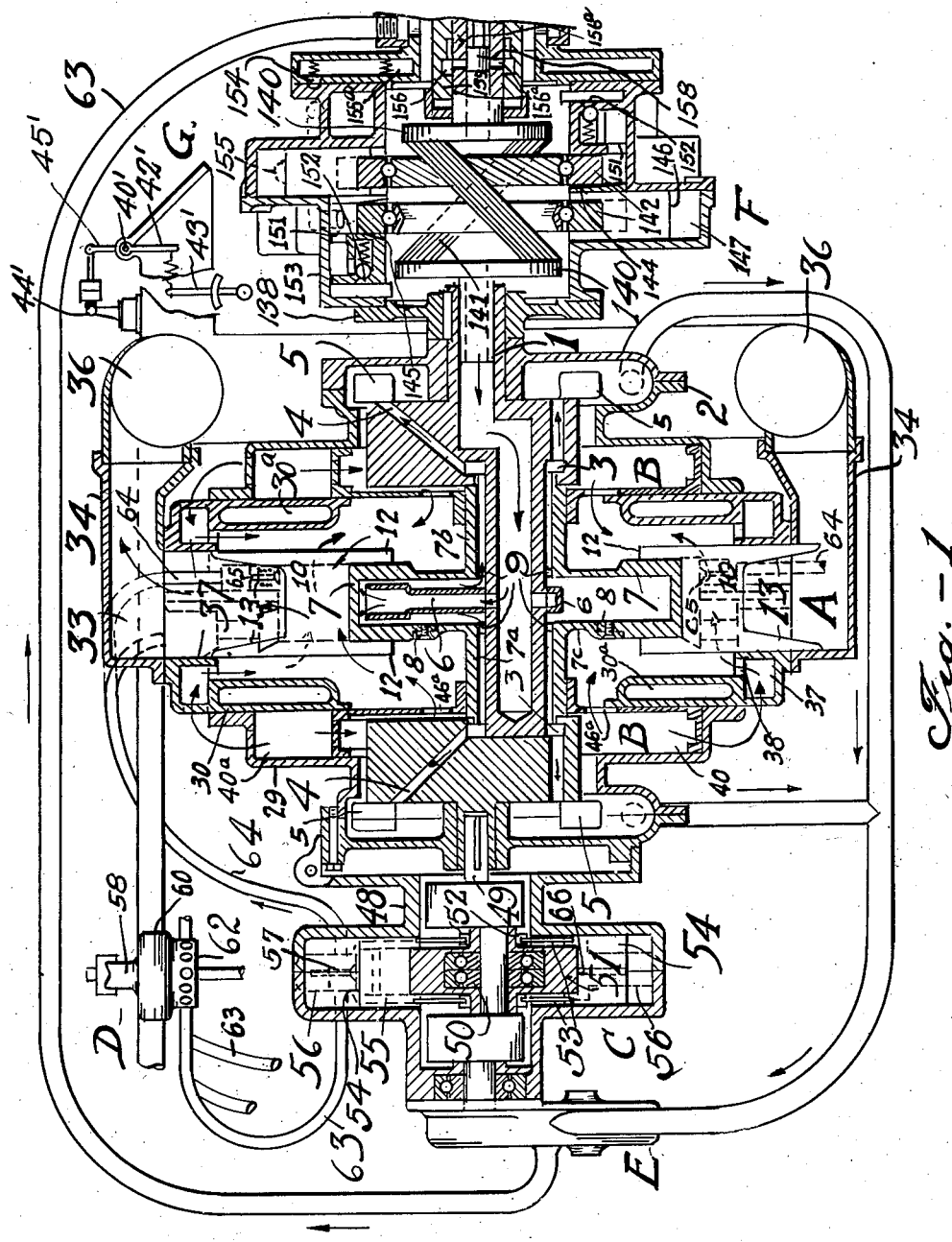
Fig. 1 is an axial section through the complete power unit referred to above, partly diagrammatic and sufficiently detailed only to show the general form and design and methods of interconnecting the parts.

Referring more particularly to Fig. 1 of the drawings, there is illustrated a two-cycle rotary internal combustion engine designated A, equipped with integral blowers, designated B, a rotary compressor designated C taking a small proportion of highly carbureted air from a carburetion system D and delivering it under pressure to the engine A, an oil circulating pump E, receiving the lubricating and cooling oil scavenged from the engine and delivering the same under pressure to a rotary oil clutch F which also serves by virtue of its rotation in free air as an oil cooler, thence through the crankshaft of the engine back to the latter. The exhaust gases from the engine are used for heating the carburetion system in the usual way. The exhaust system may be maintained under a regulated superatmospheric pressure by an exhaust control valve G fitted to the end of the main exhaust pipe, held closed when desired by a regulatable tension spring and prevented from chattering by a dash-pot dampening device, diagrammatically shown in Fig. 1 and described on page 23. The engine casing is illustrated as water cooled. The rotary power unit shown is particularly adapted to automotive vehicles by reason of its compactness, high and constant torque, vibrationless and silent operation and relatively high power to weight ratio. In such uses the hydraulic clutch permits of indefinitely extended controllable slippage with full and continuous torque transmittal at all slippage ratios. This in turn permits of the substitution of an emergency low speed and a reverse gear for the variable speed transmissions now employed in automobiles, the increase of driving torque and higher motor speeds gained from such transmissions being not required with the rotary engine. The permissible rotation speed of the latter as well as its torque is so high that under its normal or direct drive gear ratio it delivers the maximum torque required for ordinary starting, acceleration, and hill climbing and all that it is safe or advantageous to transmit with average traction conditions through driving wheels carrying only half of the weight of the vehicle. The rotary unit comprising both engine and clutch is therefore a new propulsive entity, replacing in the largest single field of service not only the reciprocating engine and friction clutch, but also the variable speed transmission necessarily associated therewith.

The engine construction shown in Figures 2 to 5 of the drawings will first be described. The crankshaft, designated 1, is a single-throw counterbalanced split shaft of the general type used in radial engines. The main drive is taken from the right-hand end, with which there is integrally forged the right counterweight and the crankpin, both crankshaft and crankpin being hollow to provide for introduction of cooling and lubricating oil. The left-hand end of the crankpin is secured by a tapered pin 2 in the integral cheek of the left-hand end of the shaft. The opposed faces of the cheeks or crank throws of the shaft have grooves 3 turned in them surrounding the crankpin and communicating with bores 4 through the counterweights. These grooves and radially inclined bores serve as centrifugal pumps to collect and discharge the oil fed in through the bore of the crankshaft. Radial flanges 5 fixed to the outer faces of the counterweights and crank throws act as the impellers of centrifugal scavenging pumps as will later appear. A radial discharge nozzle 6 for cooling oil, removably attached to the center of the crankpin and communicating with its bore through radial ports, completes the crankshaft assembly.

Figure 2:
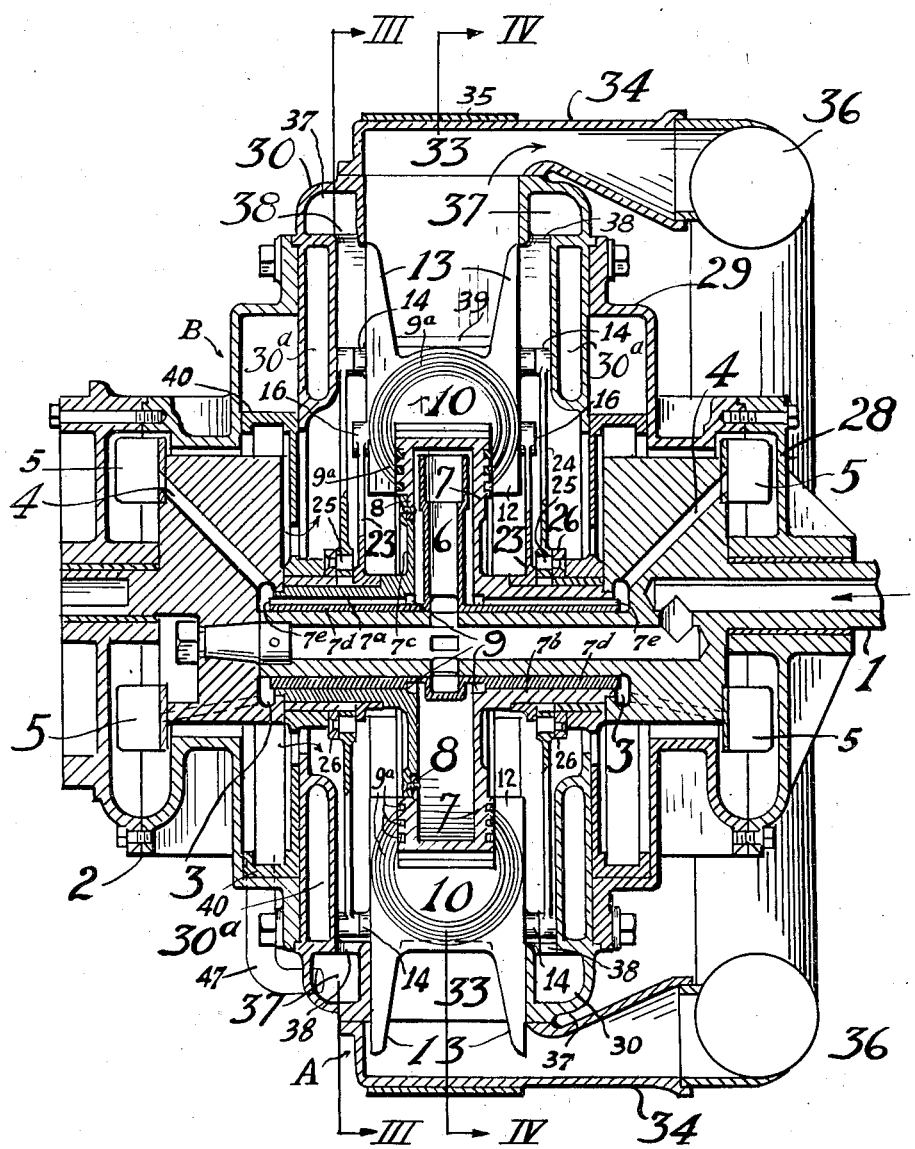
Fig. 2 is a detailed axial section through the engine and its integral blowers.

Next in order to the crankshaft is the rotor itself, designated 7, shown in axial section in Figs. 2 and 31 and in transverse section in Fig. 4. The rotor here illustrated is in the form of a hollow ring with hubs 7a and 7b extending the length of the crankpin and entering the grooves 3. To permit of fabricating and assembly the right-hand hubs 7b, right side cover plate, and annular working section are formed integrally, and the left-hand cover plate 7c and left hub 7a, also integral with one another, are removably secured to the right-hand section at the joint 8. The rotor hubs 7a and 7b are fitted with full length bearing bushings 7d which are grooved at 7e longitudinally on their outer faces to form oil outlet passages 9. The passages 9 therefor open at their inner ends into the hollow interior of the rotor 7, and at their outer ends into the grooves 3. The parallel side faces of the annular working section of the rotor are provided with circular metallic packing rings similar to piston rings. The rings are caused to exert an axial outward pressure by integral spring lugs 9a on their inner faces formed by slotting these faces of the rings at an acute angle 9b as shown in the detailed perspective view Fig. 9, where the lugs are designated 9a. These packing rings complete the rotor assembly.

Next in order of working parts are the vanes of the engine, designated 10, and shown in detail in Figs. 6 to 8 and Fig. 12. All vanes are identical. Each consists of a hollow thick plate, the main cavity of which, designated 11, extends completely through the central portion of the vane to form an internal conduit and cooling channel for the free passage of air from one side of the crankcase to the other. The vanes have rectangular central portions with depending rectangular legs 12 which straddle the rotor and extended arms 13 which are required in this form of the design to seal against leakage the casing slots through which the link bearing bosses 14 project. In each face of the vane there are inset in appropriate grooves interrupted circular metallic packing rings 15, shown in face view in Figs. 2 and 6 and in section in Figs. 7 and 8. These rings, like the rings used in the rotor, are formed with integral lugs 9a (Fig. 9) to cause them to exert an axial outward pressure against the walls of the channels in which the vanes reciprocate. The rings extend down over the faces of the depending legs 12 to embrace the rotor and thus form a single continuous loop seal above its exposed outer cylindrical face.

Referring to Fig. 4, it will be noted that the angle between the axes of the vanes and the rotor surface is variable. To preserve surface contact between the vane and rotor, it is therefore necessary to supplement the vane construction with a contact shoe, designated 16. This member is in the form of a cylindrical pin fitting into cylindrical bores in the legs 12 of the vane. That portion of the pin lying over the rotor is cut away, on an arc of the radius of the rotor and passing through the axis of the pin, as shown in Fig. 8. The corresponding portion of the vane is also cut away or beveled on the edges as shown at 17, Fig. 8, to provide the necessary clearance to permit the vane to rock on the contact pin as it changes its angle with respect to the rotor. Thus the cut-away portion of the pin remains in surface contact with the rotor, which is free to slide under the pin, and the outer cylindrical face of the cut-away central section of the pin or contact shoe also remains in surface contact with the vane as the latter rocks with relation to the pin. For sealing these rubbing surface contacts there are employed metallic packing strips. The strips used between the vane and contact shoe are designated 18. They are seated in grooves in the seating face of the vane, and pressed outwardly by integral lugs similar to the lugs 9a. For sealing the contact between shoe and rotor, I prefer to use divided packing strips, designated 19, one half of each lying at each end of the contact shoe, the two halves having a lap joint at the center. Each of the strips 19 is provided with integral spring lugs 9a, which cause it to bear on the rotor working face, and is also pressed axially inward by a spring arm 20. The purpose of this arrangement is to provide a definite seal, regardless of working clearances, between the depending leg 12 of the vane and the edge of the contact face outside of the outermost packing ring of the latter. This is accomplished by a shoulder 21 on the packing strip 19 which is yieldingly held against the edge of the rotor by the pressure of the spring arm 20. To prevent endwise leakage along the contact shoe a small packing ring 22 of the piston ring type and installed under compression may be employed. This completes the vane assembly. It will be noted that through the means shown the rotor is free to slide under the vane, and the vane is free to rock angularly with relation to the rotor, all parts in relative motion having liberal surface contacts and the sealing of all the contacting surfaces being accomplished by yieldingly held metallic packing strips of the piston ring type which by their free movements under spring pressure take up inaccuracies of workmanship, working clearances and wear, and deformation under load and temperature changes of the relatively moving surfaces.

Next in order and last of the moving parts of the engine proper are the connecting rods by which the vanes are actuated. The function of these rods is to maintain the vanes, through their contact shoes, always in contact with the rotor, which requires that as the crankshaft turns the vanes be reciprocated in their channels in the casing. The most satisfactory mechanism for this use in large engines is a connecting rod. The vanes may be treated as the pistons of a radial engine and coupled directly to the crankpin by conventional connecting rods journalled thereon. This is basically the construction here used. One of the vanes, called the master vane has a connecting rod fastened at its outer end on the projecting end of the contact shoe 16. Instead of being carried on the crankpin directly however the big end of the rod is journalled on the outside of the hub of the rotor, which as will later appear, results in the big end having only a slight oscillating motion relative to its bearing instead of full rotation thereon at each revolution of the crankshaft. The rod in question, called the master rod is shown most clearly in dotted lines in Fig. 5 and in full lines in Figs. 32, 33, 34, and 35, and is designated 23. It may also be seen in Figs. 2 and 3 however. The same vane which carries the master rod 23, carries also a boss 14 (Fig. 6) which serves as the bearing for the master link, 24. This master link is indistinguishable from the other links but is so identified because its motions are fixed by those of the same vane. The master rod 23 connected to the same vane. The inner end of the master link 24 is journalled on a bearing pin 25 carried by a link bearing ring 26. All other vanes are provided with link rods similarly journalled at their outer ends on the bosses 14 and at their inner ends on the link bearing ring 26. The length of the master rod 23, between centers, is equal to the radius of the rotor 7. The length of the master link 24 and all other link rods, between centers, is the same as that of the master rod. Since the vanes move in rectilinear paths, it follows that the construction described gives precisely the same vane motion to all vanes, to wit, that of the master vane which is operated by a simple connecting rod. While the geometry of this design is somewhat more complicated than would be the case if each vane were provided with a simple connecting rod, the construction is simplified and improved. From a geometrical standpoint it is unnecessary to employ a master rod, but the omission of this rod leaves the link bearing ring uncontrolled in its oscillations save by the links and vanes which it is in turn intended to control, and while the construction without the master rod is operative it is capable of throwing unintended stresses on the links through frictional resistances of some of the vanes tending to oscillate the link bearing ring in a manner to cause binding of other vanes against the rotor. I therefore prefer to add the master rod for engines in which the accidental stresses so created may be severe. The distance apart of the pins 14 and 16 on the vane 10 carrying the master rod 23 is the same as the radius of the circle on which are located the pins 25 in the link ring 26. It can thus be seen that the rods 23 and 24 form two of the equal sides of a parallelogram of which the radius and distance above referred to form the other pair of equal sides. The radius from the center of the crankpin 1 to the center of the pin 25 is thus always parallel with the center line of the vane, which is the line $x$ passing through the centers of pins 14 and 16. Since the angle between the center lines $x$ in two vanes is the same as the angle between the radii to their pins 25, it follows that the center line $x$ of a vane is always parallel with the radius to the center of the pin driving it through its link rod 24.

The path of the crankpin 1 is shown in Figs. 32, 33, 34 and 35 by the circle Y indicating clockwise rotation. One end of the master rod 23 moves around the circle Y and the other end of the master rod 23 imparts to its vane the familiar motion of a slider driven by a crank and connecting rod. The upper end of the link rod 24 evidently has the same motion as the upper end of the master rod 23 since both are attached to the same sliding vane 10.

This motion necessarily accompanies the parallelism of the radius and center line $x$ described above. As this parallelism has been shown to exist for all vanes 10, it follows that all of the vanes 10 have a similar crank-slider type of motion.

The lengths of the master rod 23 and the link rods 24, between centers, and the radius of the rotor 7 are all equal. As the center of the rotor 7 is at the center of the crankpin 1, the center of the pin 16 is always at the same point on the circumference of the rotor 7. Without moving anything else, it would be possible for the master rod 23 to be rotated about the center of the crank pin 1 until the pin coincides with the smaller pin in the other vane 10 shown in the drawings. This other pin is the end of the semi-cylindrical contact shoe 16. When this is done it is easy to see that the displacements of the two vanes 10 differ by an amount corresponding with a change in crank angle equal to the angle between the two vanes. Continuing this procedure all around the rotor 7 it can be seen that a corresponding displacement difference occurs from vane to vane. Vanes 10, therefore, move as though each were driven by its own master rod from the crankpin 1.

With the arrangement considered, the total number of link rods occupy a space longitudinal of the crankpin 1, equal to the thickness of one vane 10. If each vane 10 were driven by its own rod from the crankpin 1, this space would be equal to the thickness of the rod multiplied by the number of vanes. The above of course refers to each side of the rotor. In the latter case, the crankpin becomes of inordinate length and very high bending moments are introduced. The structure illustrated thus enables the crankpin to be kept within reasonable proportions.

The casing in which the crankshaft and its associated moving parts, the rotor, vanes, and connecting rods, operate is best shown as a whole in Figs. 2 and 31. It consists of a generally cylindrical housing which for fabrication and assembly may be conveniently made up of three separate sections for each half, the two halves parting on a transverse plane at the center as indicated in Figs. 10 and 31. The outer sections, designated 28, are cover plates which carry the main bearings and form the outer halves of the centrifugal pump casings for the oil scavenging pumps of which the runners are the flanges 5. The intermediate sections designated 29, form the remainder of the pump casings and the casings of the rotary blowers which will be later described. The central sections 30, constitute the engine casing proper. This casing is of annular shape, forming a parallel-sided chamber with water cooled side and outer peripheral walls, and of such width as to give only a working clearance for the rotor, which thus forms the movable inner peripheral wall of the complete annular chamber and transmits power from the crankshaft to the working fluid or vice versa. The side water jackets 30a extend radially inward over a portion only of the side walls. As shown in Figs. 10 and 31 they leave exposed directly to the crankcase a single wall 31 in which are cut the air admission ports 31a, which are shown in greater detail in Fig. 5.

Figure 3:
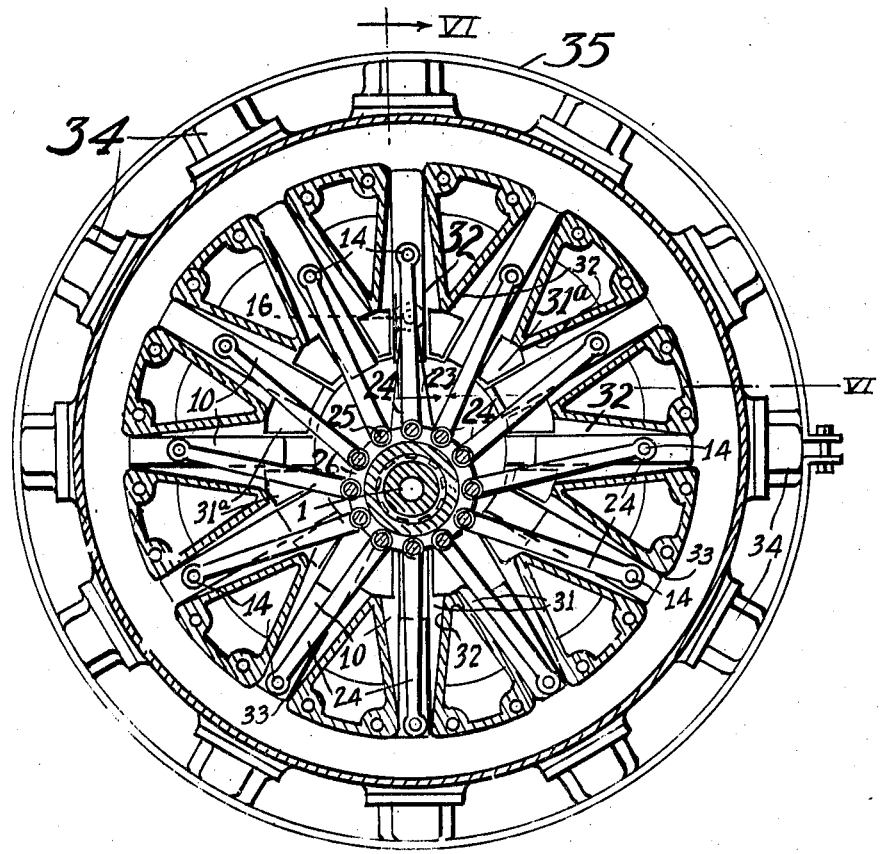
Fig. 3 is a transverse section on the line III—III of Fig. 2.

The complete annular chamber formed by the casing 30 and rotor 7 is subdivided into twelve working chambers by the vanes 10. To accommodate the vanes the casing 30 is provided with radial channels and slots which serve as slide channels for the vanes, masking at all times the lateral borders of the faces of the vanes, which faces are thus exposed to the working fluid only for the width of the rotor. The radial slots open into cored cavities which are tapered to increase in width as they approach the center, as shown at 32, Fig. 3, in order to give sufficient side clearance for the link rods 24 at their positions of greatest angularity. In addition to the lateral slots, or as an extension thereof, the casing periphery has vane channels 33 which are of the full width of the vanes and of equal thickness so that the vanes have only a working clearance therewith. The vane channels 33 serve as the exhaust ports of the engine and communicate at their outer ends with separate exhaust pipes 34 all of which are held in position by a single clamping band 35 (Fig. 3). The exhaust pipes all communicate with a single collector ring 36. The outer corners of the casing section 30 are formed by integral air ducts 37 which encircle the casing and communicate with the crankcase or interior of the casing through holes 38 (Fig. 2) which open into the cavities 32. The air which flows radially inward through the holes 38 and cavities 32, not only passes along and cools the edges of the vanes, but also passes through them at 11 in order to move from one side of the crankcase to the other. This motion is the result of the characteristics of the rotary blowers as will be later described.

The valve action of the engine will be understood from Figs. 32, 33, 34, and 35 and from Fig. 5, in which latter the crankshaft is shown at bottom dead center with respect to the working chamber for which the valve timing is shown. The timing here shown is unsymmetrical with respect to the center line of the working chamber, as follows:

Exhaust opens 72° ahead of bottom dead center of the crankshaft as shown in Fig. 32.

Intake opens 58° ahead of bottom dead center of the crankshaft as shown in Fig. 33.

Exhaust closes 50° past bottom dead center of the crankshaft as shown in Fig. 34.

Intake closes 55° past bottom dead center of the crankshaft as shown in Fig. 35.

The unsymmetrical timing of the exhaust is obtained by sloping the upper edge of the vane, as shown at 39, Figs. 2, 4, 6, 7, 32, 33, 34, and 35, and also indicated in the diagram of Fig. 5. The working chamber considered is that between adjoining vanes. At the point R on the crankcircle, shown in Figs. 5 and 32, the left hand vane 10 is in such position that its upper sloping edge 10 is in the position shown by the dotted line R, on that vane in Fig. 5 or in the position shown in Fig. 32, that is with the lower edge of the central section of the vane just about to become exposed. At this time the edge of the right hand vane 10 is at the position shown by the dotted line R in Fig. 5 on this vane or the position shown in Fig. 40. Further travel of the crankshaft therefore progressively opens a slot above the left hand vane, permitting the exhaust gases to escape at 32 into the channel 33 above the vane, thence to the exhaust pipes 34 (Fig. 4). In Fig. 33 the crankpin has moved to a position 58° before bottom dead center. The cut-off edge on the left vane is slightly open. The cut-off edge on the right vane is still masked and the inlet 31a is about to become uncovered by the rotor. Continued motion of the crankpin is accompanied by first a downward and then an upward movement of the rotor and both vanes. The inlet and exhaust ports are open during this period.

In Fig. 34 the vanes and rotor are shown during their upward movement. The cut-off edge on the right vane is just closing the exhaust port. The cut-off edge on the left vane is already masked. It will thus be seen that one vane governs the opening and the other vane governs the closing of the exhaust port. The inlet valve 31a is still very slightly open.

In Fig. 35 the crankpin is 55° past bottom dead center, the rotor is shown as just covering the inlet port 31a and both exhaust ports are closed by the vanes.

It can be seen that changes in the position and slope of the cut-off edges 39 and in the upper edges of the inlet port 31a will be accompanied by changes in the times of occurrence of exhaust and inlet from the combustion chamber. Exhaust (and inlet) can be designed to start at one point and end at any other point. This is an advantage over the usual two-cycle type of engine, in which the point of closing depends on the point of opening.

Fig. 32 shows the ports in their position at the end of the working stroke. Fig. 33 shows the ports at the beginning of the intake. Fig. 34 shows the ports at the end of the scavenging operation and Fig. 35 shows the ports at the beginning of the compression operation. By the time the crankshaft reaches bottom dead center the left hand edge of the right hand vane has also passed out of its channel 33, so that exhaust gases are also being released from this upper edge of the chamber. At the point C, on the crankcircle as seen in Fig. 5, that is 50° past bottom center, the position shown in Fig. 34, the edges of the two vanes are at the positions shown in dotted lines at C in Fig. 5, on the diagram, that is the right hand vane, which has the later timing, has just closed its exhaust channel 33.

The intake timing is controlled by the radially outer boundary of the port 31. This port or rather pair of ports, (there being identical intake ports in each side wall of the chamber) is exposed by the rotor as the crankshaft approaches bottom dead center. The point of opening is marked 0, on the crankcircle, 58° ahead of bottom center. To obtain maximum rate of opening the left hand portion of the upper boundary of the port 31 is cut to an arc of radius equal to the rotor centered on the point 0. Similarly the closing of this port is determined by the right hand portion of its upper boundary. To obtain the desired time of closing of 55° past bottom center the boundary is that of an arc of the rotor radius swung from the center S, on the crankcircle 55° past bottom center thereof.

It will be understood from the foregoing that the valve timing of intake and exhaust is independent, and that opening and closing times of each valve are likewise independent, regardless of symmetry with respect to the crank position. It will also be observed that the valve areas are adequate, and that flow of gases through the working chamber is unidirectional, to wit, always radially outward. Exhaust gases discharge first at one upper side then at both, and lastly at the opposite side. Intake gas is admitted simultaneously from opposite sides at the bottom of the chamber, first through the left hand upper portion of the ports 31, then over the entire upper portion of the ports, lastly at the right hand upper portions. This unidirectional flow through the working chamber with inlet and exhaust ports of minimum flow resistance, adequate area, and independent timing is of material aid in maintaining high torque at high speeds and is an important advantage of the rotary construction since it is accomplished solely by proper conformation and cooperative action of the three basic elements of the design, the rotor, the casing and the vane, rather than by additional mechanism. An internal combustion engine may be regarded as a conduit through which a gaseous heating agent flows, giving up its heat energy in transit by expansion. Its power output is limited primarily by the amount of working fluid which can be moved through the working chamber (under a pressure head, which must be supplied directly or indirectly by the heat energy of the fluid itself) and only secondarily by the heat efficiency of the cycle and the mechanical efficiency of the engine. The multichambered rotary engine with radially outward unidirectional gas flow through the working chambers is designed to approach the ideal of a low resistance gas flow conduit without sacrifice of the efficiency of the heat cycle and without mechanical complication.

To deliver gas under pressure to the crankcase of the engine, whence it may flow through the working chambers of the engine as described, I prefer to employ additional positive displacement blowers. These blowers are integral however in the sense that they utilize the casing and the crankpin of the engine itself. Their construction is shown in Figures 2, 13 and 14. The working element and sole moving part of each blower is a modified form of rotor designated 40. Its hub is journalled directly on the extended hub of the engine rotor 7 on which it has only a small relative movement of oscillation. Regarding the crankpin as an eccentric, the blower rotor can best be described as an eccentric strap having an eccentric arm 41 integral therewith which serves as the vane of the blower. It is sealed where is passes outwardly through the wall of the blower casing 29 by passing through a slot in a rocking pin 42 journalled in an extension 43 of the casing 29. The fluid to be displaced, in this instance air, is admitted to the casing near the vane 41 on the far side thereof as related to the direction of rotation. I have indicated an admission pipe 44 with a throttle valve 45. The displaced fluid is discharged on the side of the vane opposite the intake point. Discharge may be either through the casing or through the surface of the rotor itself. I have indicated both in Figure 13, the rotor port being designated 46 and the casing port 47. Since the rotary blowers of the engine maintain a superatmospheric pressure in the crankcase it is desirable to prevent surging of the air back into the blowers from the crankcase. This is accomplished by non-return valves in the ports 46, 47, the former lying in the plane of rotation and moving at right angles to that plane so as to be unaffected by centrifugal force. These non-return valves are not absolutely necessary for the functioning of the blower but are desirable in that they avoid back flow through the admission port at low speeds when the rotor is in the angular position shown in Figure 13, there being at that time a small portion of the admission port exposed on the advancing side of the rotor 40. Their more important function, however, is as indicated above to prevent surging when delivering into a reservoir of gas under pressure. The blower rotors 40 have a minimum working clearance with the side walls and inner periphery of their respective casings. Packing rings, not shown, similar to those employed on the rotor 7 may be used to prevent leakage past the side walls if desired.

In the position shown in Figure 13 the crescent shaped chamber between the rotor and casing is filled with air under atmospheric pressure which has been admitted through 45. As the crankshaft advances in the direction shown by the arrow, the outer face of the rotor first blanks and then passes the air admission port. Further movement displaces the entrapped air in the direction indicated by the arrows, out through the ports 46—47. At the same time atmospheric air enters through 45 filling the expanding chamber formed between the contact line of the rotor and casing and the vane. The air expelled through 47 is delivered to the adjacent air conduit 37 (Fig. 2) of the engine casing, thence through the holes 38 to the crankcase. The air expelled through 46 passes directly to the crankcase through holes 46a in the web of the rotor as shown in Fig. 14. It will be noted that the displacement of the blower rotors is not uniform for all angular movements but varies between a maximum and zero, the zero position being that of Fig. 13. It is, therefore, desirable for this reason as well as for reasons of symmetry and balance to employ two blower rotors. The vanes 41 of the two rotors should be set at a substantial angle with reference to one another to secure the most nearly uniform total delivery rate. The variation of delivery rate of each blower with angular position is the cause of the air circulation from side to side of the crankcase through the hollow vanes which has previously been referred to.

Means are provided for applying a regulated back pressure to the exhaust ports of the engine to retain therein an air volume in excess of the engine displacement volume and increasing the torque above the full normal torque. This means comprises, referring to Fig. 1, a gate valve G pivoted at 40' in position to open and close the end of the main exhaust pipe 36. The gate valve G is held closed when desired by a tension spring 41' secured at one end to an arm 42' rigid with the gate valve G and secured at its opposite end to an adjustable arm 43'. A dash-pot 44' connected to the gate valve G through an arm 45' prevents chattering of the valve G.

The engine as so far described is a complete operative two-cycle unit save for fuel supply, and, if not of the compression ignition cycle, for ignition. That is, if equipped with fuel injection devices for the working chambers it will operate according to the Diesel cycle without further additions. If operating according to the expansion-at-constant-volume cycle it requires means for supplying fuel either to the air supply, or to the working chambers directly, and in addition ignition means.

The entire air supply of the engine may be carbureted in the manner usual for two-cycle engines if desired, but in this case it is necessary to limit the blower displacement to that of the engine to avoid excessive waste of fuel, there being some waste by loss through the exhaust ports even under less displacement.

To permit of the use of excess air without waste of fuel it is desirable to carburet only one half or less of the total air supply, and to introduce this carbureted air only during the latter part of the admission phase of the cycle. This is accomplished without alteration of the general design or operation of the rotary engine described by blocking the passages 11 through the vanes, which passages alone permit direct flow of gas from one side of the crankcase to the other, and by changing the inlet port openings on one side of the engine according to the principles set forth in the description of Fig. 5, to secure a later opening time for these ports than for the other side. Thus the ports on one side may be left with the timing already described, and air alone introduced through these ports. The ports on the other side may be formed to open much later and close at the same time. The mixture introduced through these later ports will in that case be over-carbureted to carry the entire fuel supply. By this procedure it is possible to use pure air for the initial scavenging, introducing an over-carbureted mixture later in the cycle so that none of it is lost through the exhaust. The above procedure requires no engine mechanism other than that already described, and in addition to permitting use of excess air for scavenging and cooling, without fuel loss, it has the advantage of avoiding crankcase backfiring, both by reason of the delayed admission of the carbureted air, and because the over-carburetion may be carried so far as to render the mixture too rich for explosion, if it is desired to so far limit the proportion of air introduced with the total fuel supply.

In Figures 15 and 16 I have shown a rotary compressor as an independent means of fuel supply. The casing of the compressor designated 48 may be secured to the end of the engine casing as shown in Fig. 1 or may be arranged for independent mounting as shown in Fig. 15. The crankshaft, 49, is coupled to a suitable drive as for example the engine crankshaft. Like the engine crankshaft it is a counterbalanced single-throw shaft. The crankpin carries a ball bearing 50, which in turn carries the rotor 51, the hub of which surrounds but does not touch the crankpin. Link bearing rings 52 are journalled on the hub, and carry pins which serve as inner bearings for the link rods 53 which operate the vanes 54. The link rods here shown are in the form of slightly bowed spring steel bars which are anchored or journalled on pins in the depending hollow legs of the vanes which straddle the rotor. These directly-connected short link rods do not accurately meet the geometrical requirements of the mechanism, but in rotary machines of small size the departure from theoretical motion may be so small as to be met by very slight expansion and contraction of an elastic link rod.

The casing 48 is widened to receive and form side channels for the vanes 54, the widened portions for two diametrically opposite vanes being shown in section in Fig. 15. Between vanes the casing is reduced to the width of the rotor itself as shown in dotted lines at 55, Fig. 15, and its outer portion still further narrowed as shown at 56 to form the admission and exhaust passages and to house the automatic poppet valves 57 and their springs.

The rotary compressor takes suction on a carburetor indicated diagrammatically at 58, Fig. 16. This carburetor may supply only that amount of air required for minimum load condition of the engine and in that case requires no throttle valve. It supplies the total fuel requirements for all loads, however, and is therefore provided with means, shown as a cam-operated needle valve 59, for opening the fuel delivery nozzle for loads above the minimum. The carburetor is of the down-draft type, delivering directly into an exhaust heated vaporizer 60 adequate as to its heating surfaces to vaporize the entire fuel supply if desired. This vaporizer is preferably of the general form shown, consisting of a heater jacket surrounding an annular mixture passage formed by casting a core 61 in the center, the core being connected with the heater jacket by a plurality of helically twisted thick ribs which conduct heat to the core. The helical ribs which conduct heat to the core. The helical heater passages thus formed by the jacket, ribs, and core, discharge the carbureted air with a whirling motion into a bottom chamber, 62, thence radially outward through a ring of holes each of which connects to an individual suction pipe 63 leading to the admission valve of one of the working chambers of the compressor. The pipes 63 are all of equal length and all pitched downward from the chamber 62 throughout their length. The purpose of this construction is to secure equal delivery of air and of fuel, whether vaporized or not vaporized, to each of the working chambers of the compressor. A delivery line 64 receives the compressed carbureted air, with or without unvaporized fuel, swept through by the air from each working chamber of the compressor and delivers it to the respective working chamber of the engine, where it is introduced through a spring loaded automatic valve of the pop type which requires a higher pressure to open it than to maintain it in the open position.

Such a valve is indicated diagrammatically in Fig. 10, and designated 65. In view of the circumstance that the exhaust port of the engine remains open until some time past bottom center on the engine crankshaft, it is desirable to delay admission of the carbureted air until about this time. Since ignition begins some time before top dead center, delivery should be complete well before that time. These conditions are met by setting the compressor crankpin ahead of the engine crankpin, (for example 50° to 100° ahead) and by controlling admission through the loaded valve 65, which will not open until a substantial pressure has been built up in the working chamber of the compressor after which the valve remains open under a low pressure difference.

In general the minimum air requirements per revolution of an internal combustion engine are of the order of 10% of the maximum requirements. Since a perfect mixture of gasoline vapor in air consists of approximately 2% by volume vapor and 98% air, it follows that the vapor content of the mixture handled by the compressor and delivered to the engine will range from about 2% at minimum load to about 20% at full load, assuming perfect vaporization. So long as the temperature is maintained above the dew point of the richest mixture by the combined effect of the vaporizer 60 and the heat of compression there will be no condensation in the lines 64, but the size of these lines is so small and the velocity so high that neither lack of vaporization nor partial condensation will affect the proportions of fuel delivered to the engine chambers. For cold starting the spraying action of the high pressure delivery of the mixture through the loaded valve 65, produces sufficient vaporization to insure ignition. It will be understood that for starting purposes the mixture produced in the carbureter 58 may be temporarily richened as in ordinary practice.

The vanes 54, may be used as pump pistons to provide additional capacity for the compressor by drilling them from their upper edges and from one face near the bottom as shown in dotted lines in Figs. 15 and 16 at 66. This provides a passage connecting the closed channel above the vane with the working chamber, and since this channel is expanded and contracted by movement of the vane corresponding with the rotor movement by which the working chamber expands and contracts, the channel becomes in effect a part of the chamber itself. Since the lateral opening of the passage 66 is blanked off by entering the wall of the channel when the vane approaches the outer end of its stroke, there is a high terminal pressure built up on the upper end of the vane which counteracts the inertia force of the vane as in ordinary reciprocating steam engine design.

The operation of the rotary compressor as a whole is as follows: Assuming the crankshaft to be turned by the engine or other source of power, the rotor 51 has the motion of an eccentric strap with an infinitely long connecting rod, that is each point on the rotor describes a circle of radius equal to the crankcircle. By this motion of the rotor the working chambers are progressively contracted, compressing and expelling the air contained therein. Because the rotor radius so closely approaches the radius of curvature of the inner casing periphery the minimum clearance inherent in the design is very small, being of the maximum thickness represented by the divergence of the rotor arc and the casing arc over one half the angular interval of a working chamber, plus the working clearance of the rotor outer surface against the casing surface. The latter clearance should be sufficient to prevent the rotor from rolling on the inner face of the casing. Such rolling action would result in a relative velocity of the rotor surface and casing at the point opposite the rolling contact equal to twice the crank velocity, which rubbing velocity would also be in effect as between the rotor outer surface and the vane or contact shoe on this side. (For the sake of simplicity of illustration the contact shoes have been omitted in the showing of the compressor.) While there is a tendency of the rotor to roll on each vane, the vanes are in contact at all times at equidistant points around the rotor periphery and the frictional forces which tend to create rolling are therefore substantially balanced. Minor inaccuracies which destroy the absolute frictional torque balance cause the rotor to drift or creep slightly, by rotating on its own center. This is a desirable motion which equalizes wear and lubrication and maintains a polish on its working surface.

The rotation of the crankshaft as described results in sucking air through the carburetor 58 where it picks up the fuel delivered from the jet controlled by the needle 59, thence through the heater 60, and from the bottom chamber of the latter through the individual suction pipes 63, to and through the automatic air inlet valve of the working chamber into the chamber. The intake period for each chamber covers 180° motion of the crankshaft, the vanes being pulled radially inward to maintain their contact with the rotor during this motion by the link rods 53. During the succeeding 180° of motion the chamber in question is contracted radially to compress and expel through the chamber outlet valve, thence through the delivery line 64, the air drawn in during the preceding suction period. During the compression movement the vanes bounding the chamber in question are moved radially outward, primarily by their link rods 53 but also positively by the rotor itself. The maximum rubbing velocity is that of the rotor side wall against the casing which is constant for all points on the rotor side faces and equal to the crank velocity. There is no load on these rubbing surfaces. The mean rubbing velocity of the vanes against the casing is the same as that of a reciprocating pump, that is twice the crankcircle diameter per revolution. The rubbing velocity of the vanes (or contact shoes) against the rotor surface is a function of the ratio of crank throw to rotor radius, but is in general about the same as the relative velocity of the vanes and casing. Side pressure from the compressed gases on the vanes is largely balanced, and reaches its maximum when the exposed vane surface reaches its minimum. Bearing pressure of the vanes (or contact shoes) against the rotor arises only from the use of the elastic connecting rods here illustrated as replacing geometrically correct rods of the form shown on the engine itself. It will be apparent therefore that the design is one in which rubbing velocities are of the same magnitude as in reciprocating fluid displacement devices of similar stroke and R. P. M., that the points of maximum rubbing velocity are without load, either from working pressure or from inertia forces, that the vane side wall load due to working pressures is inherently balanced out to a considerable extent and as to the unbalanced remainder is low in the case of elastic working fluid since working pressure and exposed area vary inversely, and that there is no inherent load either inertia or working, on the rotor-vane contact surface, the whole being transferred to the connecting rods if so desired, although a limited load may be imposed here by the use of geometrically inaccurate elastic rods or springs. It will also be noted that while the inner ends of the connecting rods are journalled on a separate bearing ring which is free to rotate on the rotor hub, there is no motion of relative rotation at this point save that due to the drift of the rotor.

The foregoing detailed description of the operation of the rotary compressor will assist in an understanding of the operation of the engine. The operating cycle of the engine is indicated on Fig. 4. The letter "W" identifies the chambers, four in number, which are on the expansion or working portion of their cycle. The letters I E, identify the succeeding three chambers which are exhausting and simultaneously receiving the air supply for scavenging and for the next working phase. As previously explained the valve timing illustrated gives the exhaust opening a lead of 14° crankshaft motion over the intake opening which permits the release of the residual working pressure before the air ports open. I prefer to use a blower displacement equal to approximately twice the engine displacement. Allowing for the entrance loss and slippage of the blower this gives a positive air delivery considerably in excess of the engine displacement. By the use of this excess air in combination with the uniflow valve or port locations, the following results are obtained:

1. Scavenging of the exhaust gas is substantially complete, not only the displacement volume but also the clearance volume as well being left with a charge of relatively cool air undiluted with exhaust gases.

2. The chamber walls and exhaust channels are cooled and the exhaust channels left with a charge of relatively cool air instead of a charge of hot exhaust gas in contact with them during the ensuing compression and expansion.

3. A small amount of supercharging is effected incidentally by the delayed closing of the inlet, which takes place 8° after closing of the exhaust and thus permits the chamber pressure to build up to some point between exhaust pressure and crankcase pressure.

The combined effect of these factors is to give a mass of air in each working chamber at the time of closing of the intake of this two-cycle rotary engine greater than the mass of the charge in an unsupercharged four-cycle engine of equal displacement, this being primarily the result of the inherent design and functioning of the engine rather than a result of definite supercharging. By increasing the blower displacement, closing the exhaust earlier or the intake later or by all of these means definite supercharging can be effected to any desired degree. The same result may be effected by maintaining a regulated superatmospheric pressure on the exhaust system through a loaded valve on the exhaust outlet as is diagrammatically indicated at G in Fig. 1.
This will automatically raise the delivery pressure of the positive displacement blowers and result in supercharging equal to the pressure in the exhaust system without regard to the timing of the intake and exhaust closing since all of the scavenging air must now be pushed through the working chamber under the pressure fixed by the exhaust control valve.

The chamber identified by the letter "I" in Fig. 4, is that which is still receiving air under pressure after the closing of the exhaust ports and therefore being supercharged. The succeeding four chambers, identified by the letter "C" are on the compression phase of the cycle.

The above description of the engine cycle is general and applicable both to expansion-at-constant-volume and expansion-at-constant-pressure internal combustion engines. For the former cycle I prefer to employ the means of introducing the fuel already described, to wit, the rotary compressor supplying all of the fuel atomized or vaporized by the minimum air requirement per revolution of the engine. This charge of carbureted air is introduced under pressure during the compression phase of the cycle, thus giving additional supercharging to the extent of about 10%, and increasing turbulence, which is of advantage in itself. Regulation of the engine under these conditions is effected by throttling of the air supply to the blowers, as indicated diagrammatically in Fig. 13, and simultaneously closing the needle valve of the carbureter by the cam adjustment thereof. At the no-load or idling position the blowers are throttled almost completely, there being only sufficient delivery required from them to ventilate the crankcase. Substantially the entire air supply under these conditions comes from the fixed air inlet of the compressor. This aids in giving regular low speed idling because of the uniformity of delivery of the fuel and air to the working chambers from the small compressor chambers which work always at full volumetric efficiency and therefore maintain a constant discharge pressure and high velocity through the small delivery lines 64.

The operation of the engine on the expansion-at-constant-pressure or Diesel cycle is the same as heretofore described save that direct fuel injection replaces the delivery of carbureted air. I have shown means for such direct injection in Figs. 18 to 20, which will be later described.

The cooling of the casing of the engine is accomplished in the conventional way by water jackets 30a as shown. These jackets surround the casing walls of the working chamber completely save for the inner flanges in which the air ports are located. To minimize pressure loss and increase delivery through these ports the flange of the casing wall is as thin as is consistent with structural strength at this point so that the air ports are in effect orifices in a plate, receiving air directly from the crankcase and opening into the working chambers without passing through any conduit. This avoids the lapse of time required to accelerate an air column in a conduit or passage formed by a port in a thick wall.

The vanes are sheathed in their channels during the high pressure and high temperature phases of the cycle, becoming exposed to the working gases progressively as expansion takes place. Their heat absorption is therefore less per unit of area than that of a piston, heat absorption being further greatly reduced by the fact that their surfaces remain polished. Cooling of the vanes is effected primarily by their direct transfer of heat to the surfaces of the water jacketed channels 33, in which they slide. Secondarily they are cooled by motion of the scavenging air over their exposed edges and through their centers.

The rotor is internally cooled by lubricating oil supplied by the nozzle 6. Special provision must be made to effect satisfactory cooling with this medium. The requirement to be met is that oil must be supplied at an adequate rate to limit the average temperature rise, and that there must be high-velocity turbulent circulation over the surfaces to be cooled. The first requirement is met by providing a circulating pump "E" (Fig. 1) of adequate capacity, and appropriately large delivery passages. The second requirement is met by extending the delivery nozzle out to the inner periphery of the rotor as shown in Figs. 1, 2 and 4, and by making it wide enough to act as an effective impeller. Since this nozzle is fastened to and rotates with the crankshaft, while the rotor itself has no definite motion of rotation with respect to the casing, the nozzle acts as an empeller to circulate the entire body of oil around within the rotor at crankshaft speed. The incoming fresh oil is delivered at the periphery by the nozzle 6, under pump pressure, and forced out at the center through the grooves in the outer faces of the bearing bushings of the rotor hub. Centrifugal force plays no part in the supply of the cooling oil or its internal circulation, both being positive displacement actions varying directly with engine speed. Centrifugal action is relied upon however to remove the oil from the collecting grooves 3 (Fig. 2) at a rate in excess of its supply to prevent the building up of a pressure in these grooves, and also for scavenging the compartments in the end casings 28, into which not only the cooling oil but also the lubricating oil flowing through the main bearings and rotor bearings collects.

Because of the very small relative motion and light loads on the connecting rods and links and their bearing rings forced feed lubrication of these is not essential. They are lubricated by oil spray in the scavenging air, picked up from the blowers or specially supplied to the inlet air. The same lubrication is preferably relied upon for the rubbing surfaces of the working chambers of the engine being here supplemented if desired by admixture of lubricating oil with the fuel. Force-feed direct lubrication may however be applied at any points desired.

The rotary engine is especially suited for operation at high speeds by its kinematic design, mechanical structure, and gas flow characteristics. Such high speeds result in high maximum power per unit of displacement which in turn raises the relative efficiency at low power outputs as compared with slow speed engines because of the reduced frictional and thermal losses of the smaller engine. Thermodynamic efficiency as well as power output is limited as in all engines by the heat cycle which in turn is fixed by the permissible compression ratio. In this respect the rotary engine has the advantage of positive direct cooling of all of the surfaces of the working chambers which permits of substantial increase of compression over existing practise. Complete scavenging of exhaust gas and internal cooling of the chamber by excess scavenging air contributes to the same result, as does the drifting of the rotor by which its exposed surface is kept polished by rubbing contact with the contact shoes and their sealing strips.

In Fig. 4, I have illustrated the working chambers as having conventional dome shaped heads. For producing high turbulence it is desirable to employ instead the form of head illustrated in Figs. 10 and 11. In this turbulent head substantially the entire clearance volume is in the pocket 66. The spark plug enters this pocket, being screwed into the bore 67. The remainder of the chamber head has a very small clearance over the rotor surface as shown in Fig. 11.

In Figures 17 to 21 I have shown an air cooled two-cycle rotary engine in which the vanes are employed as reciprocating pump pistons for delivering air or mixture under pressure to the crankcase. This engine has a crankshaft 92 mounted in bearings in the casing 93. The rotor 94 is shown as carried on a ball bearing on the crankpin, its hubs being brought down around but not bearing on the crankpin. The hubs have journalled on them link bearing rings 95 which carry the inner ends of elastic link rods 96 which are journalled on pins in the vanes 97 at their outer ends. The vanes 97 are long enough to remain at all times within their channels 98, and the latter are closed at their outer ends and provided with automatic air inlet valves 99 therein which receive air or fuel mixture from a ring conduit 100 which forms the intake pipe of the engine. A similar ring type exhaust manifold 101 is connected with the exhaust ports of the working chambers by exhaust pipes 102 shown in Figure 26.

In addition to the valves 99 it is necessary to provide vane valves and exhaust valves. The former, designated 103 are automatic pump valves located in the vane heads and discharging through the hollow interior of the vanes to the crankcase. The exhaust valves, designated 104 are located in the heads of the working chambers and are of the usual construction save for their operating means. This operating means consists of rocker arm 105 pivoted on the casing, bearing at the center on the stem of the exhaust valve, and actuated at its free end by a shoulder formed on an offset projecting arm 106 integral with the vane. The vane channel 98 is slotted to receive the arm 106, the arm having finished surfaces which seal the walls of the slot to prevent leakage under the low pressure of the pumping action of the vanes. The engine assembly is completed by fans 107 keyed to the crankshaft and delivering air by centrifugal action over the cooling fins of the casing. The ignition distributor may be located within the fans, a space 107a being indicated for its reception.

The operation of this engine is as follows: At each revolution of the crankshaft each vane completes a reciprocation within its closed channel and thereby inspires a charge of air or mixture and delivers it to the crankcase, acting as an ordinary reciprocating pump. From the crankcase, in which all of the air or mixture becomes homogeneously admixed, the air or mixture is delivered through ports 31 shown in Fig. 19 directly to the working chambers as previously described. As the crankshaft approaches inner dead center with respect to each working chamber, the inward motion of the vane brings into contact with the rocker arm 105 the projection of the vane arm 106, and thus opens the exhaust valve. Shock of contact may be avoided by appropriately sloping the engaging faces of the projection and rocker arm.

The exhaust valve timing with this operating mechanism is necessarily symmetrical with respect to the relative position of the crankshaft and vane center line, but since the center line of the chamber is one-half a chamber interval from the vane center line, it follows that the exhaust valve timing is similarly unsymmetrical with respect to the chamber itself. According to the direction of rotation the exhaust will either open early and close early, or open late and close late. The former timing is generally preferable with this engine and is obtained with counter-clockwise rotation of the crankshaft as viewed in Figure 27.

The construction shown in Figures 17 to 20 is especially suitable for small engines of relatively low maximum speed which are required to maintain constant torque over a wide speed range.

In Figures 22 to 24 I have shown a simplified design of stationary crankshaft air cooled two-cycle rotary engine in which the centrifugal force engendered by the rotation of the casing is used to inspire and deliver the mixture and to assist in the removal of the exhaust gases. The engine is shown as of the stationary type, mounted on a base 108 having two supports. In one of the supports the stationary crankshaft 109 is fixed. The other support carries a ball bearing in which is journalled the driving stub shaft 110 integral with the engine casing 111. Coaxial with its driving stub-shaft the same end of the casing has an internally projecting boss 112 carrying a ball bearing which supports the free end of the crankshaft. The rotor 113 is carried 113a on a ball bearing on the crankpin, its hubs 113b being brought down to surround but not to bear upon it. The web of the rotor is perforated to permit free passage of gas through it and to avoid unnecessary heating of the bearing. The vanes 113c are operated by elastic link rods 113d journalled in bearing rings 113e on the rotor hubs 113b, the construction being the same as that of the engine shown in Figs. 17—18. The admission of mixture to the working chambers is through casing ports 31 exposed by the rotor and the exhaust is through the vane channels, all as described in connection with Figs. 2 to 5.

The exhaust gases passing from the outer open ends of the vane channels emerge directly into a ring muffler 114 which is fastened to the casing 111 and revolves with it. To collect the gases leaving the muffler through the perforations 115 in its periphery there is provided a stationary housing like that of a centrifugal blower. This housing is supported from the base 108 by radial arms 116. In its side walls it has slots 117 through which a portion of the cooling air drawn in between the arms 116 is vented directly to the atmosphere. That portion of the radially and circumferentially moving air which does not escape through these slots mixes with the exhaust gases discharged by the muffler perforations 115, and by centrifugal action is delivered to a tangential outlet pipe 118 by which it is conducted away. The dilution of the exhaust gases by a portion of the cooling air serves to reduce their temperature and thus to hold the housing and outlet pipe at a lower temperature. The centrifugal air delivery action which is relied upon for the cooling of the engine and the delivery of its exhaust gases through the outlet pipe 118 is increased by the impeller action of the cooling ribs of the engine casing and by the radially extending portions 119 of the engine casing which house the vanes.

The fixed end of the crankshaft 109 is connected to an elbow, thence to a down-draft carbureter 120. The power of the engine is delivered from the casing stub shaft 110, preferably through a rotary clutch 121, the details of which will be hereafter described. The engine is equipped with the usual spark ignition mechanism, not shown.

Assuming that the engine casing is rotated at a reasonably high speed for starting purposes, the gases contained in the crankcase flow radially outward under the action of centrifugal force, through the admission ports 31 and into and through the working chambers which have their exhaust ports open. Being thus charged with explosive mixture these chambers with further rotation progressively compress, ignite, and expand this mixture, thereby applying a torque to the casing against the reaction of the rotor which is journalled on the crankpin of the fixed crankshaft. It will be noted that centrifugal action not only inspires air through the carbureter and delivers the carbureted air to the working chambers, but also forcibly removes the exhaust gases from the chambers and from the muffler 114. The engine itself is in effect a centrifugal blower through which the carbureted air moves radially outward, being trapped in the working chambers en route and completing a working cycle of compression, combustion and expansion therein before it escapes.

Since the functioning of this engine is dependent upon the maintenance of a speed high enough to create the necessary centrifugal force it is preferable to connect it with all ordinary loads through a rotary clutch which permits it to be loaded gradually without reduction of speed and also permits it to apply a constant torque to the load at any desired low speed, down to zero speed, of the driven member.

Figures 25, 26:
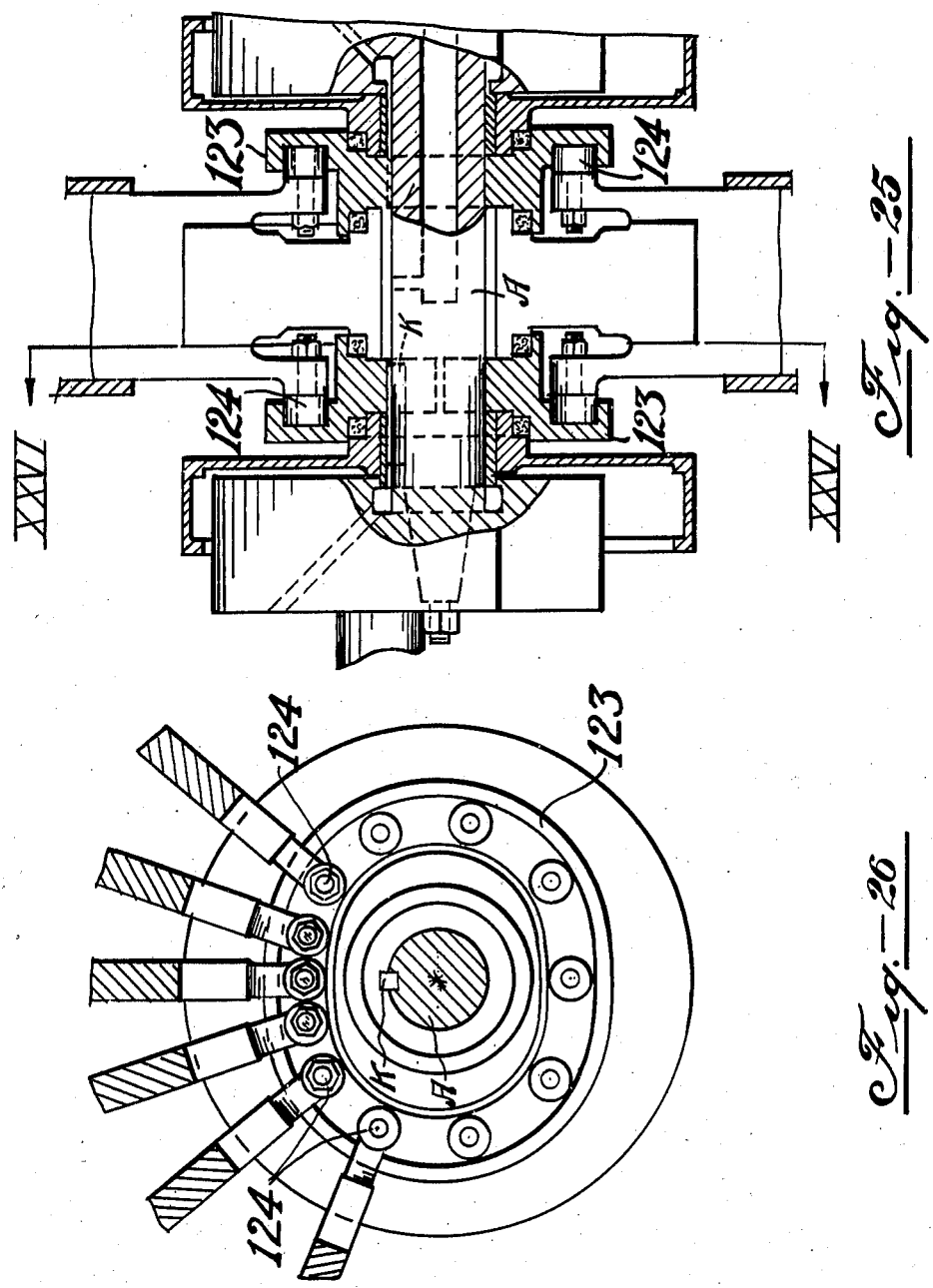
Fig. 25 is a fragmentary axial section showing the vanes of a rotary machine operated by a cam attached to the crankpin.
Fig. 26 is a section on the line XXVI—XXVI of Fig. 25.

In the constructions heretofore described I have shown the vanes as operated by simple connecting rods (the master rods of Figs. 1 to 5), by rigid link rods of the same length as and giving the same motion as simple connecting rods, and by shorter elastic link rods which by yielding make up for the geometrical inaccuracy of their design. In Figs. 25 and 26 I have shown another method of operating the vanes, that is, a cam 123 keyed to the crankpin and having a groove or track in which a roller 124 journalled on a pin carried by an extending arm of the vane operates. The form of the cam track is shown in Fig. 26. The departure from circular form of the cam track is a function of its relative diameter, the greater the diameter the more nearly circular its form. When the cam becomes of the same diameter as the rotor, it assumes the shape of a true circle and may therefore be free to rotate on the crankpin instead of keyed thereto. It follows that it may then be journalled on the rotor hub, instead of on the crankpin itself, and as a last step it may be integral with the rotor, all of which consequences flow from the relation of the cam form to its diameter relative to the rotor. It will of course be apparent that the throw or eccentricity of the crankpin relatively to the rotor radius is also a factor in the departure from circular form of any cam of less diameter than the rotor, the departure increasing as the throw increases.

Figure 27:
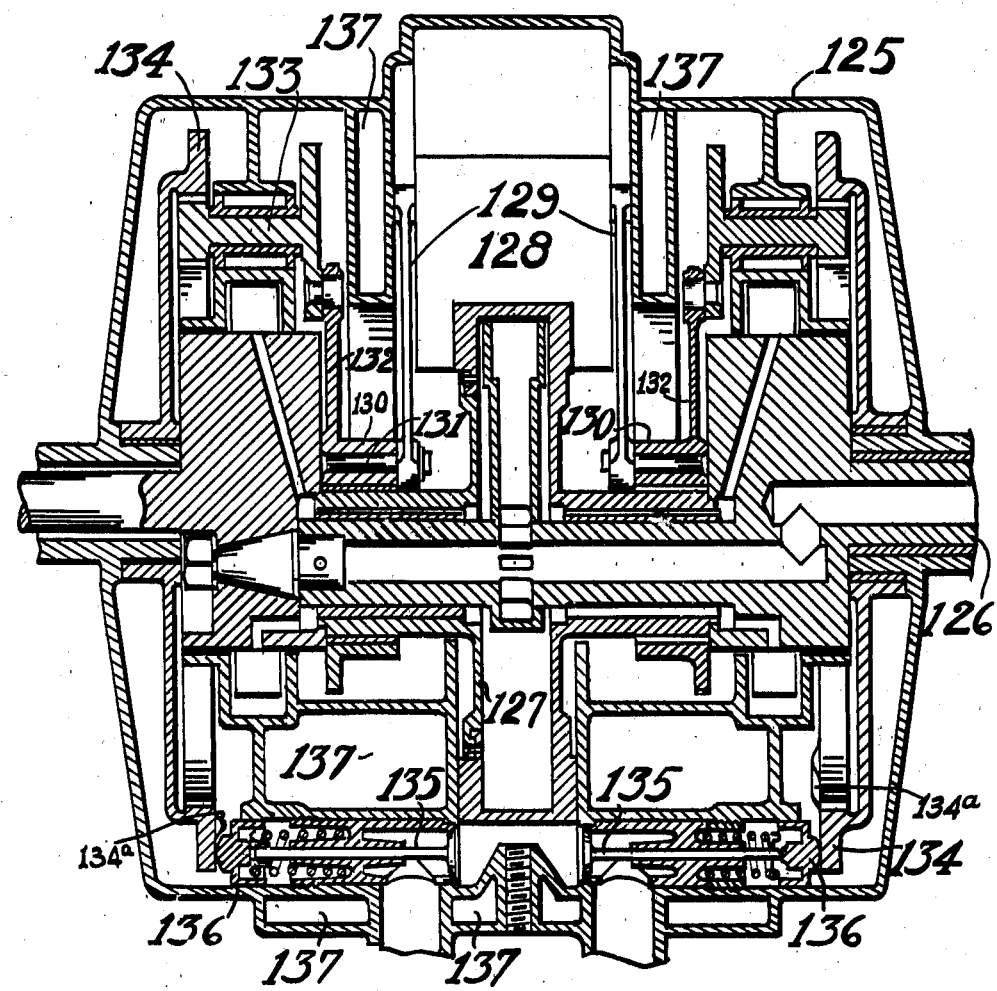
Fig. 27 is an axial section of a four-cycle rotary internal combustion engine.
Figure 28:
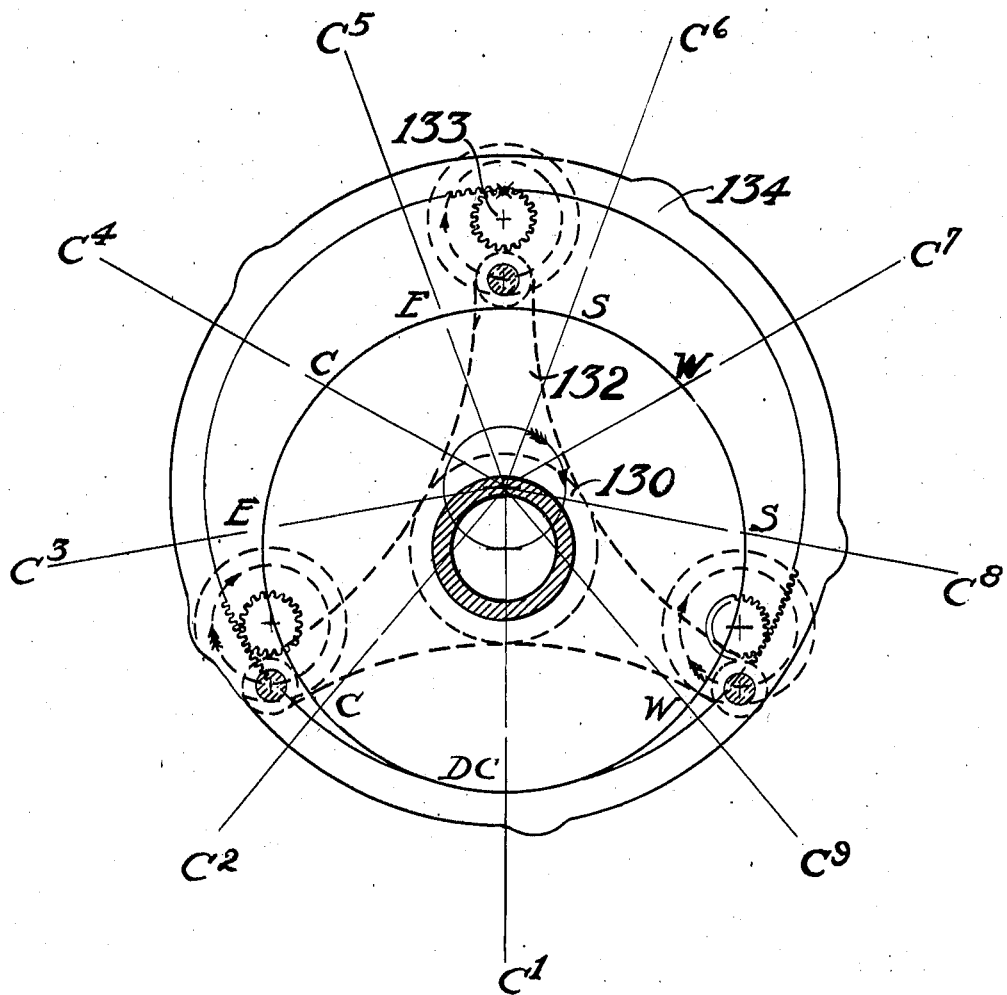
Fig. 28 is a diagram of the valve cam and its operating gearing, showing the timing of the valves.

In Figs. 27 and 28 I have shown a four-cycle rotary engine. The casing of this engine is designated 125, the crankshaft 126, the rotor 127 and the vanes 128. This engine has nine chambers, and in Fig. 27 the section line therefor passes thru a vane at the upper portion and thru the center of a working chamber in the lower portion.

The vanes 128 are operated by rigid link rods 129 of the same form as those described in Figs. 2 to 5, these link rods being journalled at their inner ends on link bearing rings 130 carrying bearing pins 131. The rings 130 are employed as drivers for the valve operating cams. Each ring 130 is provided with three integral arms 132 which at their outer ends are journalled on crankpins of throw equal to the main crankpin of the crankshaft and carried by the shafts of the three cam driving gears 133. These driving gears mesh with the internal ring gears 134 which carry the lobes 134a for operation of the intake and exhaust valves. Gears 134 are driven by the gears 133 which in turn get their motion from the arms 132. All points on the arms 132 move in a circle, see Fig. 28. The valves are symmetrically arranged in side clearance pockets of the working chambers, being shown at 135. They are operated by tappets 136 which bear directly on the working faces of the cam gears.

In Fig. 28 the valve operating mechanism is diagrammed, the cam lobes being shown on the periphery of the cam instead of in their actual location on the side face, for the sake of clarity. The ratio of the cam driving gears to the ring gear of the cam is 1:10. The cam is equipped with five identical equidistant lobes, the angular length of each lobe being therefore one tenth of the crank shaft angle during which valve action takes place. The working chambers operate in the sequence 1, 3, 5, 7, 9, 2, 4, 6, 8, 1 etc. as is usual with radial four cycle engines, the center lines of the chambers and the relation of each to the rotor being shown by the lines $C_1$ to $C_9$, in the diagram. Beside the center line of each chamber is a letter indicating the phase of its cycle. The letters D C on the center line $C_1$, indicate the dead center position of this chamber, which is about to enter upon its suction stroke, that is it is about to open its intake valve as shown by the position of the cam lobe below it. Chamber $C_2$ is in its compression phase, $C_3$ exhaust, $C_4$ compression, $C_5$ exhaust, $C_6$ suction, $C_7$ working, $C_8$ suction, $C_9$ working. The timing of the valves chosen for purposes of illustration in the diagram is conventionalized timing, each valve being open for 180° crankshaft movement corresponding to 18° cam movement, and opening and closing taking place on dead center of the crankshaft with respect to each chamber. From this conventionalized timing departures may be made as desired and as is well understood in the art.

The valve operating mechanism of the four cycle rotary engine is designed to permit of the high rotational speed for which the rotary engine is especially suitable. The large diameter of the cam permits of cam lobes of easy curvature and the tappets, which alone are interposed between the cam and valve, are of minimum weight. The drive of the cam ring 134 from the cam driving gears 133 which are coupled to the link bearing rings 130, by means of arms 132 also serves the purpose of maintaining these bearing rings in their correct angular positions at all times, replacing the master rods used in Figs. 2 to 5. Like the two cycle engine described in connection with these views, the four cycle engine has a water cooled casing and an oil cooled rotor.

Water jacket spaces are indicated at 137 on Fig. 27. The rotor cooling arrangements are identical with those earlier described.

Figure 29:
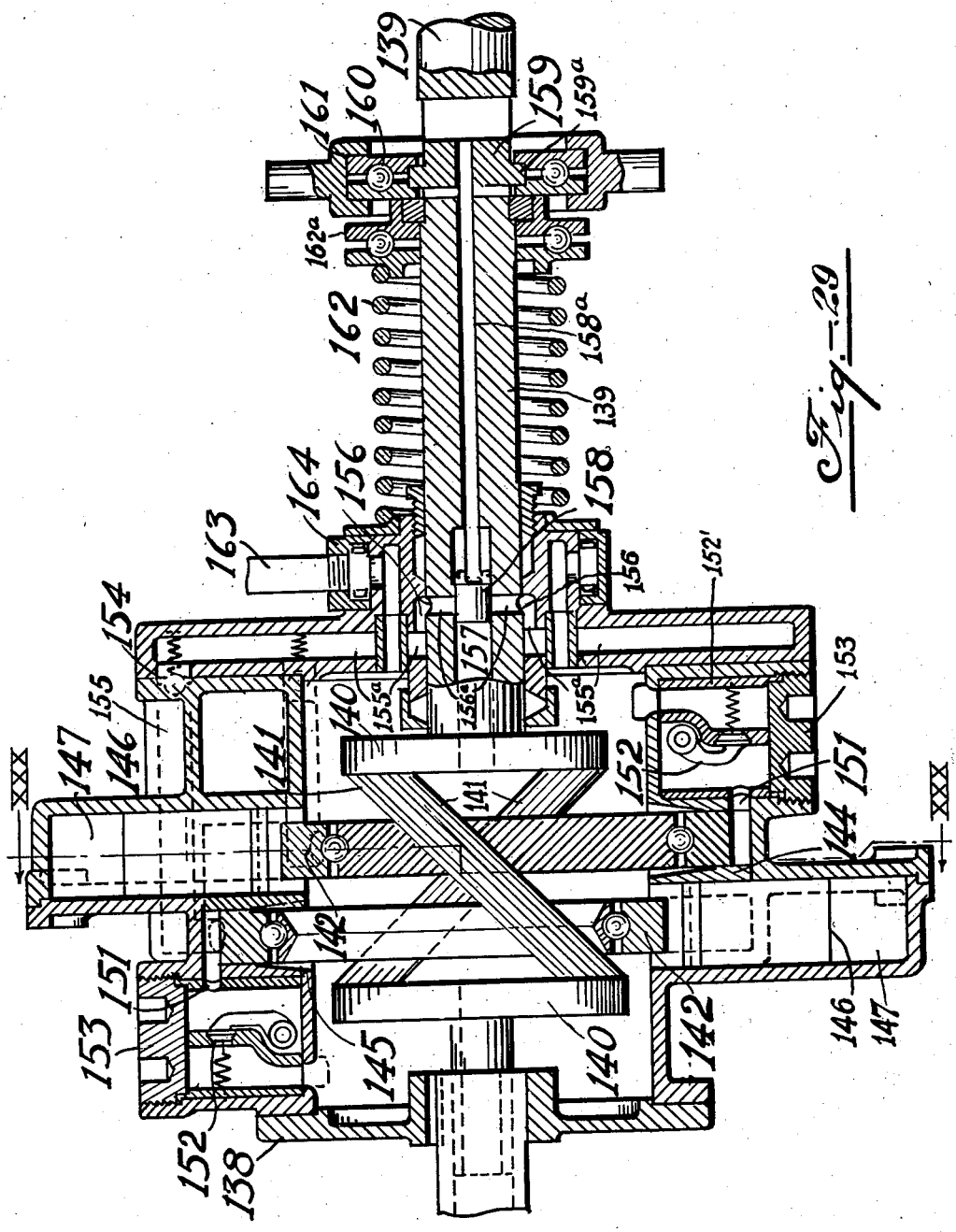
Fig. 29 is an axial section of the hydraulic clutch or coupling shown as an independent unit.
Figure 30:
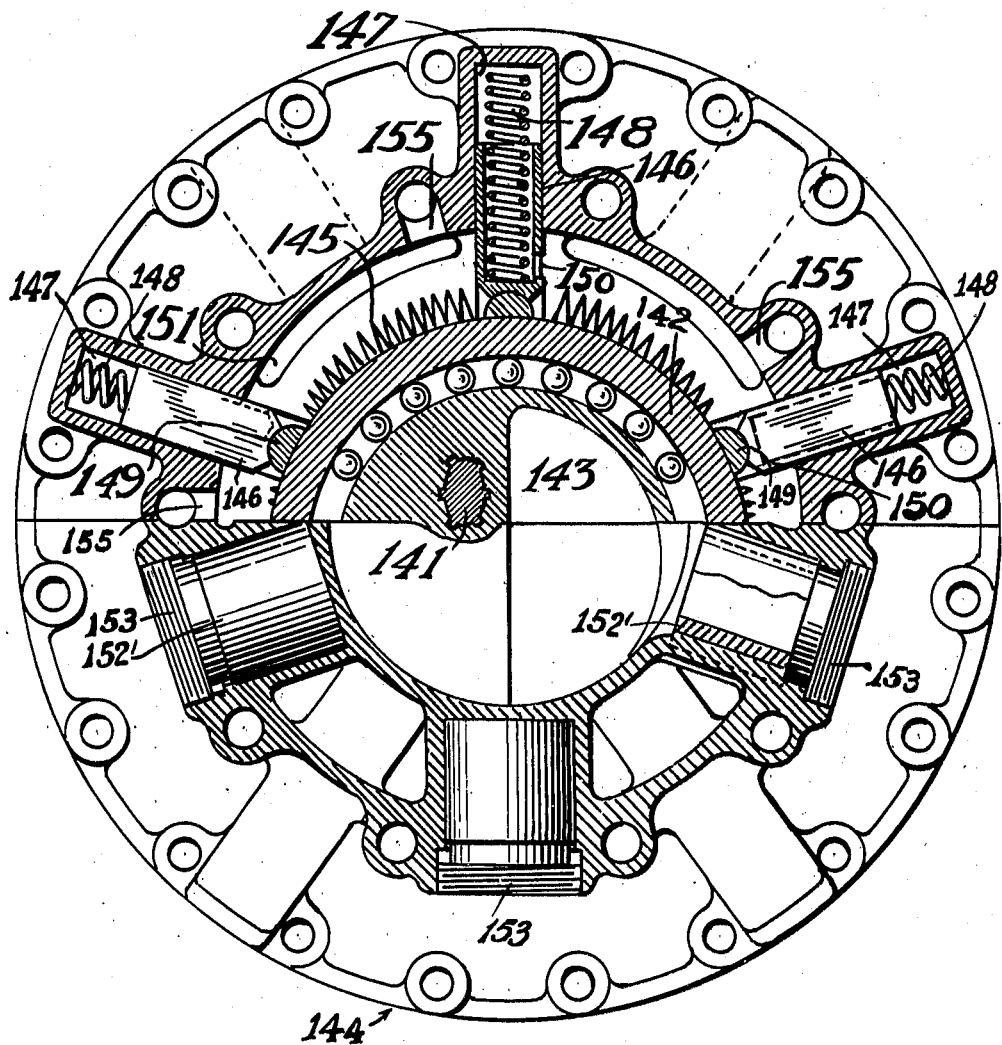
Fig. 30 is a transverse section of the same on the line XXX—XXX of Fig. 29.

In Figs. 29 and 30 I have shown the rotary clutch or coupling as an independent unit. The casing thereof, designated 138 is the driving member in ordinary service, altho the mechanism is fully reversible. The driven member is a shaft 139 passing thru a stuffing box and bearing in one end of the casing and having a pilot bearing in the other end of the casing. Within the casing the shaft is divided, each end carrying a T head 140, the two heads being joined by crankpins in the form of inclined splined bars 141 which lie in offset planes on either side of and parallel with an axial plane of the shaft. The twin rotors 142 are formed as annular ball bearings, the inner race of each being carried by one of the bars 141 which passes thru an inclined splined hole therein. Each inner race is cut out on one side as shown at 143 (Fig. 30) to clear the bar on which the other race is mounted. Each of the rotors operates in a separate chamber of the casing, the two chambers being separated by a common wall 144. This wall as well as the outer face walls of the chambers has leakage grooves 145 milled in its surface, the grooves being of maximum depth and width at the inner ends and tapering to points at the outer ends. The outer ends lie on a circle of about the mean radius of the chamber, leaving the outer portion of the chamber walls unaffected. Each working chamber is subdivided by vanes 146 sliding in channels 147 which also house compression spring 148 which hold the contact shoes 149 in contact with the rotor surface. The vanes are hollow and are vented on one side as shown at 150 to open into the working chamber on that side. Each of the two rotary units has six vanes. The two sets of vanes may coincide angularly for easy balancing, or may be staggered, the latter construction being here shown for clarity.

For admission of the working fluid to the working chambers the latter have liberal inlet ports 151 in their outer side faces. The fluid is supplied from the crankcase thru automatic inlet valves 152 (Fig. 29) carried in cages 152' which are held in the casing by closure plugs 153. The valves 152 are designed to be unaffected by centrifugal force, the seat lying in the radial line of the pivot. In the general view (Fig. 1) the inlet valves have been illustrated as simple ball valves moving in a line parallel with the axis of rotation. In Fig. 29 this same construction is illustrated in connection with the outlet valves 154. The latter prevent inflow thru the outlet or relief ports 155 which communicate with the top of each working chamber and by appropriate passages 155a in the casing with a groove 156 surrounding the shaft 139. The portion of the shaft adjacent this groove has radial ports 156a opening into a central bore 157 drilled in from the T head of the shaft and thus opening to the crankcase. To control flow of oil from the outlet ports to the crankcase thru the ducts described there is provided a plunger valve 158 fitting the bore 157 and having a stem 158a which passes outward thru the shaft 139 to a point of attachment to a T head 159 sliding in a slot thru the shaft. The outer prongs 159a of the T head 159 are loosely engaged between the races of a ball thrust bearing 160 which is operable by a ring 161 with which the clutch operating yoke, not shown, is connected.

The clutch is normally held in the fully engaged position shown in Fig. 29 by a spring 162 bearing at one end against the casing and at the other against a thrust collar 162a and bearing on the shaft 139. Fluid may be supplied continuously to and thru the clutch casing by a pipe 163 which enters a hollow gland 164 riding on a boss on the face of the casing and communicating with the crankcase thru the ducts shown. From the crankcase the fluid may be discharged thru a bore in the driving shaft as described in connection with Fig. 1. It will be understood however that if the casing be initially filled with oil or other liquid, no continuous supply or discharge is required and that the pipe 163 and gland 164 may be omitted in such cases, the clutch with its initial filling being a complete self-contained unit.

In the fully engaged position shown in Fig. 29 operation of the clutch is as follows. The rotation of the casing applies a torque to the shaft 159 thru the oil bodies contained in the working chambers then in their compression phase. The lever arm or effective crank throw of each rotor is the amount of its eccentricity. The slippage is limited to the leakage rate of the working chambers, since the leakage grooves 145 have been overrun by the rotors, and the only outlet for the trapped oil is closed by the plunger valve 158. Leakage is replaced during the expansion phase of the slippage movement of the rotors by oil admitted from the crankcase thru the inlet valves 152, this delivery being assisted by centrifugal force.

As the clutch collar 161 is moved inward to the position shown in Fig. 1 to disengage the clutch the bars 141 slide thru the splined holes in the rotor inner races and reduce the eccentricity of the rotors, each rotor moving at the same rate. As the eccentricity decreases the fluid pressure for constant torque transmission increases, with resultant increase of the slippage. This increase may be negligible however until the rotors appreciably overrun the leakage grooves 145, at which time rapid slippage occurs if the load be held constant. To limit the stresses on the clutch the leakage grooves increase rapidly in cross section as the rotors approach center so that no high load can be carried at a position of small eccentricity. In the fully disengaged position of the clutch, shown in Fig. 1, the rotors are concentric with the shaft 159 and are free to turn as ball bearings on their inner races. There is therefor no wear or relative movement of any of the parts, save the ball bearings in this disengaged position.

To again engage the clutch the ring 161 is retracted. The first effect is to withdraw the plunger valve 158 from its bore 157, and thus permit free discharge of the oil trapped in the working chambers. This permits the spring to move the shaft 139 outward, causing the rotors to be displaced equally and oppositely. As the shaft reaches the position to which the collar 161 has been withdrawn, the plunger valve again closes its bore, cutting off further escape of the trapped oil from the working chambers. The ball valves 154 prevent the various chambers from discharging into one another thru their outlet or relief ports. As will be clear, the sole function of these outlet ports is to permit rapid engagement of the clutch by permitting the rotors to be freely moved outward by the clutch spring when the clutch collar is moved to permit the clutch to engage. At any stable position of the clutch the sole discharge is by leakage, at first thru the leakage grooves, and during the outer part of the travel of the rotors, only inherent leakage of the rubbing surfaces. The clutch is completely reversible as to driving and driven ends and operative in either direction of rotation. It is further operative as a hydraulic brake, being capable of indefinite slippage, the rate of slip or braking torque for any load being adjustable by control of the eccentricity of the rotors thru the operating ring. The design is capable of being perfectly balanced in the plane of rotation for all positions and all conditions of slip, the inherent necessities of such balance being obtained from the use of twin rotor and vane systems displaced always equally and oppositely and therefore remaining in both static and dynamic balance at all times. There is a small unbalanced couple in an axial plane, its arm being the axial distance between centers of the rotors. This axial distance is so short that this couple is of low magnitude.

In the foregoing specifications and in the drawings I have described and illustrated a number of related inventions which to varying degrees are susceptible of use in combinations other than the specific combinations here disclosed.

It is my purpose to claim in the appended claims all of the novel subject matter here disclosed as broadly as is permissible in view of the prior art.

I claim:

1. A fluid displacement machine comprising a crankshaft, a rotor rotatably mounted on the crankpin thereof, a concentric annular casing having parallel side faces with which the rotor makes fluid tight sliding contact and an inner peripheral face which has a minimum clearance with the opposed cylindrical surface of the rotor sufficient to avoid rolling contact therewith, a plurality of radially moving vanes forming fluid tight partitions across the space between the rotor and casing, the vanes being guided in the casing to have a motion of simple rectilinear reciprocation therein, and a contact shoe interposed between the end of each vane and the cylindrical surface of the rotor having an oscillating contact surface with the vane and a sliding contact surface with the rotor, the axis of curvature of the oscillating contact surface being an element of the sliding contact surface of the contact shoe whereby in its movement of oscillation relative to the rotor surface the vane swings on an axis coincident with the rotor surface, a connecting rod of length equal to the rotor radius joining the crankpin and vane to cause positive reciprocation of the vane by rotation of the crankshaft, and means for admitting and exhausting working fluid to and from the chambers formed by the rotor, casing and vanes.

2. In a fluid displacement machine comprising a rotor and a concentric annular casing having parallel side faces provided with channels ending in pairs of opposed radial slots in parallel side faces of the casing, a flat vane having depending legs sliding in the said slots and straddling the rotor, the side faces of the vanes being sealed against the faces of the casing channels and slots in which the vanes reciprocate by a sealing strip recessed in the face of the vane and extending from one depending leg around the face of the vane to the other depending leg.

3. A fluid displacement machine comprising a crankshaft, a rotor rotatably mounted on the crankpin thereof, a concentric annular casing having parallel side faces with which the rotor makes fluid tight sliding contact and an inner peripheral face which has a minimum clearance with the opposed cylindrical surface of the rotor sufficient to avoid rolling contact therewith, the casing being further provided with channels ending in pairs of opposed radial slots in the said parallel side faces, a vane of width greater than the rotor arranged for reciprocation in each channel and pair of slots and having depending legs sliding in the said slots and straddling the rotor, a contact shoe carried by each vane at its inner end and having an oscillating surface contact with the rotor, vane reciprocating means comprising a connecting rod of length equal to the rotor radius joining the crankpin with the vane, and means for admitting and exhausting working fluid to and from the chambers formed by the rotor, casing and vanes.

4. A fluid displacement machine comprising a crankshaft, a rotor rotatably mounted on the crankpin thereof, a concentric annular casing having parallel side faces with which the rotor makes fluid tight sliding contact and an inner peripheral face which has a minimum clearance with the opposed cylindrical surface of the rotor sufficient to avoid rolling contact therewith, the casing being further provided with channels ending in pairs of opposed radial slots in the said parallel side faces, a vane of width greater than the rotor arranged for reciprocation in each channel and pair of slots and having depending legs sliding in the said slots and straddling the rotor, a contact shoe carried by each vane at its inner end having an oscillating surface contact with the vane and a sliding surface contact with the rotor, vane reciprocating means comprising a connecting rod of length equal to the rotor radius joining the crankpin with the vane, said connecting rod being journaled on the rotor, and means for admitting and exhausting working fluid to and from the chambers formed by the rotor, casing and vanes.

5. A fluid displacement machine comprising a crankshaft, a rotor rotatably mounted on the crankpin thereof, a concentric annular casing having parallel side faces with which the rotor makes fluid tight sliding contact and an inner peripheral face which has a minimum clearance with the opposed cylindrical surface of the rotor sufficient to avoid rolling contact therewith, the casing being further provided with channels ending in pairs of opposed radial slots in the said parallel side faces, a vane of width greater than the rotor arranged for reciprocation in each channel and pair of slots and having depending legs sliding in the said slots and straddling the rotor, a contact shoe carried by each vane at its inner end and having an oscillating surface contact with the vane and a sliding surface contact with the rotor, vane reciprocating means comprising a connecting rod of length equal to the rotor radius joining the crankpin with the vane, said connecting rod being journaled on a bearing ring concentric and rotatable with respect to the crankpin, and means for admitting and exhausting working fluid to and from the chambers formed by the rotor, casing and vanes.

6. A fluid displacement machine comprising a crankshaft, a rotor rotatably mounted on the crankpin thereof, a concentric annular casing having peripheral side faces with which the rotor makes fluid tight sliding contact and an inner peripheral face which has a minimum clearance with the opposed cylindrical surface of the rotor sufficient to avoid rolling contact therewith, a plurality of radially moving vanes forming fluid tight partitions across the space between the rotor and casing, and fluid admitting means on the extreme radially inner portion of each working chamber and fluid exhausting means on the extreme radially outer portion of each working chamber whereby fluid movement through the working chambers formed by the rotor, casing and vanes is radially outward throughout its extent.

7. In a fluid displacement machine, the combination with a cylinder, a crankpin, a rotor having a hub mounted on the crankpin within the cylinder, radially disposed vanes reciprocably mounted in slots in the cylinder dividing the cylinder into compartments traversed by the rotor, and means for maintaining the vanes in contact with the rotor including link rods connected to each vane and to a ring freely mounted for oscillation on the hub.

8. A fluid displacement machine according to claim 7 in which the link rods are connected pivotally to each vane and to the ring.

9. A fluid displacement machine according to claim 7 including a master rod rotatively connected to one of the vanes at a point coincident with the periphery of the rotor and including a collar mounted for oscillation upon the hub, the lengths of the master rod and link rods between their centers of rotation being equal to the radius of the rotor whereby the vanes are driven by the master rod.

10. In a fluid displacement machine, the combination with a cylinder, a crankpin, a rotor having a hub mounted on the crankpin within the cylinder, radially disposed vanes reciprocably mounted in slots in the cylinder dividing the cylinder into compartments traversed by the rotor, a master rod rotatively connected to one of the vanes at the periphery of the rotor and including a collar rotatably mounted upon the hub, link rods connected pivotally to each vane and to a ring freely mounted on the hub, the lengths of the master rod and link rods between their centers of rotation being equal to the radius of the rotor, the distances between the connection of the link rod and master rod to the vane being equal to the radius of the circle on which are located the connections of the link rods to the ring.

11. A variable torque positive displacement internal combustion engine, comprising a chamber containing a rotary piston operated as a two cycle engine, an air blower driven by the engine and of capacity substantially in excess of the engine displacement, means for supplying the air delivered by the blower to the intake ports of the engine during the period of its cycle in which the exhaust ports are likewise opened, whereby the excess delivery of the blower passes through the engine for internal cooling of its combustion chamber walls, means for regulating such air supply whereby the air volumes admitted per cycle may be reduced below the engine displacement for reduction of engine torque below full normal torque, and means for delivering a gaseous fuel mixture to the combustion chamber after the closing of the exhaust ports.

12. A variable torque positive displacement internal combustion engine according to claim 11, in which means are provided for applying an increased regulated back pressure to the exhaust ports of the engine to retain therein an air volume in excess of the engine displacement volume and increasing the torque above the full normal torque.

13. A variable torque positive displacement internal combustion engine according to claim 11, in which a valve held closed by a regulatable tension spring is provided on the exhaust port for applying an increased regulated back pressure to the exhaust port of the engine to retain an air volume therein in excess of the engine displacement volume and to increase the torque above the full normal torque.

14. In a fluid displacement machine, the combination with a casing, a rotor therein, a series of vanes reciprocably mounted in slots in the casing dividing the casing into several compartments traversed by the rotor, each of the compartments being provided with a supply port and an exhaust port at extreme radially opposite ends of the compartment.

15. In a fluid displacement machine, the combination with a casing, a rotor therein, a series of reciprocably mounted vanes in slots in the casing dividing the casing into several compartments traversed by the rotor, each of the compartments being provided with a supply port at the radially inner end of the compartment opened and closed by the rotor, and each vane being provided with an exhaust port opening into the compartment near the end of the radially inward stroke of the vane.

16. In a fluid displacement machine, the combination with a casing, a rotor therein, a series of vanes reciprocably mounted in slots in the casing dividing the casing into several compartments traversed by the rotor, each of the compartments being provided with a supply port at the radially inner end of the compartment opened and closed by the rotor, the radially outer end of each vane unmasking an exhaust opening at the end of the radially inward stroke of the vane, said opening extending radially outwardly through the slot in which the vane operates, and a conduit for conducting off the exhaust from the slot.

17. In a fluid displacement machine, the combination with a casing, a rotor therein, a series of vanes reciprocably mounted in slots in the casing dividing the casing into several compartments traversed by the rotor, each of the compartments being provided with a supply port at the radially inner end of the compartment opened and closed by the rotor, the radially outer end of each vane having an exhaust recess opening at opposite sides of the vane into adjoining compartments near the end of the radially inward stroke of the vane and opening radially outwardly of the vane into its slot, and a conduit for conducting off the exhaust from the slot.

18. In a fluid displacement machine, the combination with a casing, a rotor therein, a series of vanes reciprocably mounted in slots in the casing dividing the casing into several compartments traversed by the rotor, each of the compartments being provided with a supply port at the extreme radially inner end of the compartment opened and closed by the rotor, a blower for directing air through the open inlet ports, and means for withdrawing exhaust from the compartments.

19. In a fluid displacement machine, the combination with a casing, a rotor therein, a series of vanes reciprocably mounted in slots in the casing dividing the casing into several compartments traversed by the rotor, an inlet port for each compartment, each vane having spaced arms protruding from opposite ends of its radially outer surface engaging the walls of the slot, the radially outer surface between the arms being inclined to the longitudinal axis of the vane from one side of the vane to the other and being drawn into the compartment at the end of the radially inward stroke of the vane to permit flow of exhaust gases into the slot.

20. In a fluid displacement machine, the combination with a casing, a rotor therein having a hub, a series of vanes reciprocably mounted in slots in the casing dividing the casing into several compartments traversed by the rotor, each of the compartments being provided with a supply port and an exhaust port at radially opposite ends of the compartment, means for supplying air to the supply port during the period of the cycle in which the exhaust port is likewise opened and in quantity greater than the engine displacement, and means for maintaining the vanes in contact with the rotor including link rods connected to each vane and to a ring freely mounted for oscillation on the hub of the rotor.

21. In a fluid displacement machine, the combination with a casing, a rotor therein having a hub, a series of flat vanes reciprocably mounted in slots in the casing dividing the casing into several compartments traversed by the rotor, each of the compartments being provided with a supply port and an exhaust port at radially opposite ends of the compartment, means for supplying air to the supply port during the period of the cycle in which the exhaust port is likewise opened and in quantity greater than the engine displacement, means for maintaining the vanes in contact with the rotor including link rods connected to each vane and to a ring freely mounted for oscillation on the hub of the rotor, the side faces of the vanes being sealed against the faces of the casing channels and slots in which the vanes reciprocate by a continuous loop sealing strip recessed in the face of each vane, and means for circulating a cooling fluid through the interior of the rotor, the cooling fluid being of a character suitable for lubrication and the circuit thereof including the lubricating circuit of the rotor bearing.

22. A fluid displacement machine comprising a crank-shaft, a rotor rotatably mounted on the crank pin thereof, a concentric annular casing having side faces with which the rotor makes fluid-tight sliding contact, a plurality of radially moving vanes forming fluid-tight partitions across the space between the rotor and casing, the vanes being guided in the casing for reciprocation therein, and connecting rod of length equal to the rotor radius joining the crank pin and vane to cause positive reciprocation of the vane by rotation of the crank-shaft, and means for admitting an exhaust working fluid to and from the chambers formed by the rotor casing and vanes.

23. In a fluid displacement machine comprising a rotor and a concentric annular casing having side faces provided with channels ending in pairs of opposed radial slots in the side faces of the casing, a vane having depending legs sliding in the said slots and straddling the rotor, the side faces of the vanes being sealed against the faces of the casing channels and slots in which the vanes reciprocate by a sealing strip between the face of the vane and the channels and extending from one depending leg around the face of the vane to the other depending leg.

24. A fluid displacement machine comprising a crank-shaft, a rotor rotatably mounted on the crank pin thereof, a concentric annular casing for the rotor, the casing being provided with channels ending in pairs of opposed radial slots in its side faces, a vane of width greater than the rotors arranged for reciprocation in each channel and pair of slots and having depending legs sliding in the slots and straddling the rotor, vane reciprocating means comprising a connecting rod of length equal to the rotor radius joining the crank pin with the vane, and means for admitting an exhaust working fluid to and from the chambers formed by the rotor casing and vanes.

25. A variable torque positive displacement internal combustion engine, comprising a chamber containing a piston operated as a two-cycle engine, an air blower driven by the engine and of capacity substantially in excess of the engine displacement, means for supplying the air delivered by the blower to the intake ports of the engine during the period of its cycle in which the exhaust ports are likewise opened whereby the excess delivery of the blower passes through the engine for internal cooling of its combustion chamber walls, means for regulating such air supply whereby the air volumes admitted per cycle may be reduced below the engine displacement for reduction of engine torque below full normal torque, and means for applying an increased regulated back pressure to the exhaust ports of the engine to retain therein an air volume in excess of the engine displacement volume and increasing the torque above the full normal torque, the means including a valve connected with the exhaust ports and resilient means for governing the position of the valve.

26. In a fluid displacement machine, the combination with a casing, a rotor therein, a series of reciprocably mounted vanes in slots in the casing dividing the casing into several compartments traversed by the rotor, each of the compartments being provided with a supply port at the radially inner end of the compartment opened and closed by the rotor, and an exhaust port opening into the compartment near the end of the radially inward stroke of the vane and opened and closed by the vane.

27. In a fluid displacement machine, the combination with a cylinder, a crank pin, a rotor mounted on the crank pin within the cylinder, radially disposed pistons reciprocably mounted in slots in the cylinder, a plate freely mounted on the crank pin, connecting rods pivoted to the pistons and plate, and a master rod of the same length as the connecting rods pivotally connected to one of the pistons and to the crank pin whereby oscillation of the plate is prevented.

28. In a fluid displacement machine, the combination with a cylinder, a crank pin, a rotor mounted on the crank pin within the cylinder and having a minimum clearance with the inner peripheral face of the cylinder, radially disposed pistons reciprocably mounted in slots in the cylinder, and piston reciprocating means equal to the rotor radius joining the crank pin with each piston, the piston reciprocating means including a ring on the crank pin and connecting rods secured to the ring and to the piston.

29. In a fluid displacement machine, the combination with a cylinder, a crank pin, a rotor mounted on the crank pin within the cylinder and having a minimum clearance with the inner peripheral face of the cylinder, radially disposed pistons reciprocably mounted in slots in the cylinder, a plate freely mounted on the crank pin, connecting rods of length equal to the rotor radius joining the plate to the pistons, and a master rod of length equal to the rotor radius pivotally connected to one of the pistons and to the crank pin whereby oscillation of the plate is prevented.

30. In a fluid displacement machine, the combination with a cylinder, a crank pin, a rotor mounted on the crank pin within the cylinder, radially disposed vanes reciprocably mounted in slots in the cylinder dividing the cylinder into compartments traversed by the rotor, a plate freely mounted on the crank pin, connecting rods pivoted to each vane and plate, and a master rod of the same length as the connecting rods pivotally connected to one of the vanes and to the crank pin whereby oscillation of the plate is prevented.

31. In a fluid displacement machine, the combination with a cylinder, a crank pin, a rotor having a hub mounted on the crank pin within the cylinder, radially disposed vanes reciprocably mounted in slots in the cylinder dividing the cylinder into compartments traversed by the rotor, a plate freely mounted on the crank pin, connecting rods pivoted to the vanes and to the plate, and a master rod pivotally connected to one of the vanes and to the crank pin, the link rods and master rod being of the same length and parallel to each other whereby oscillation of the plate is prevented.

32. In a fluid displacement machine, the combination with a cylinder, a crank pin, a rotor having a hub mounted on the crank pin within the cylinder, radially disposed vanes reciprocably mounted in slots in the cylinder dividing the cylinder into compartments traversed by the rotor, a plate freely mounted on the hub, connecting rods pivoted to the plate and to the vanes, and means connected to one of the vanes and to the hub to prevent oscillation of the plate.

33. In a fluid displacement machine, the combination with a cylinder, a crank pin, a rotor having a hub mounted on the crank pin within the cylinder, radially disposed vanes reciprocably mounted in slots in the cylinder dividing the cylinder into compartments traversed by the rotor, a plate freely mounted on the hub, connecting rods pivoted to the plate and to the vanes, and a master rod of the same length as the connecting rods pivotally connected to one of the vanes and to the hub whereby oscillation of the plate is prevented.

34. In a fluid displacement machine, the combination with a cylinder, a crank pin, a rotor having minimum clearance with the inner periphery of the cylinder and mounted on the crank pin within the cylinder, radially disposed pistons reciprocably mounted in slots in the cylinder, and piston reciprocating means comprising a connecting rod of length equal to the rotor radius joining the crank pin with the piston, said connecting rod being journaled on the bearing ring concentric radially with respect to the crank pin.

35. In a fluid displacement machine, the combination with a cylinder, a crank pin, a rotor having a hub mounted on the crank pin within the cylinder, radially disposed vanes reciprocably mounted in slots in the cylinder dividing the cylinder into compartments traversed by the rotor, a master rod rotatably connected to one of the vanes on the periphery of the rotor and including a collar rotatably mounted upon the hub, a link rod connected pivotally to each vane and to a plate freely mounted on the hub, the links of the master rod and link rods between their centers of rotation being equal to the radius of the rotor.

36. A fluid displacement machine comprising a crank shaft, a rotor rotatably mounted on the crank pin thereof, a concentric annular casing for the rotor, a plurality of radially moving vanes forming fluid-tight partitions across the space between the rotor and casing, fluid admitting means on the extreme radially inner portion of each working chamber, and fluid exhausting means on the extreme radially outer portion of each working chamber whereby fluid movement through the working chambers is radially carried out throughout its extent.

FRANK A. HOWARD.